(12) United States Patent
Kamvar et al.

(10) Patent No.: US 11,018,989 B2
(45) Date of Patent: May 25, 2021

(54) RESOURCE STABILIZATION IN A DISTRIBUTED NETWORK

(71) Applicant: Celo Foundation, San Francisco, CA (US)

(72) Inventors: Sepandar Kamvar, Belmar, NJ (US); Marek Olszewski, San Francisco, CA (US); Rene Reinsberg, San Francisco, CA (US); Marcin Jerzy Chrzanowski, San Francisco, CA (US); Asa Oines, San Francisco, CA (US); Roman Croessmann, Berlin (DE); Markus Franke, Berlin (DE)

(73) Assignee: Celo Foundation, San Francisco, CA (US)

( * ) Notice: Subject to any disclaimer, the term of this patent is extended or adjusted under 35 U.S.C. 154(b) by 0 days.

(21) Appl. No.: 16/825,137

(22) Filed: Mar. 20, 2020

(65) Prior Publication Data
US 2020/0304421 A1    Sep. 24, 2020

Related U.S. Application Data

(60) Provisional application No. 62/821,231, filed on Mar. 20, 2019.

(51) Int. Cl.
*H04L 12/911* (2013.01)
*G06Q 20/06* (2012.01)
(Continued)

(52) U.S. Cl.
CPC ........ *H04L 47/783* (2013.01); *G06F 16/2246* (2019.01); *G06Q 20/00* (2013.01);
(Continued)

(58) Field of Classification Search
CPC ... H04L 9/0637; H04L 12/1804; H04L 47/76; H04L 47/783; H04L 2209/466;
(Continued)

(56) References Cited

U.S. PATENT DOCUMENTS 10,467,694 B2 * 11/2019 Katsuyama ............. H04L 47/12
10,621,666 B2 *  4/2020 Katsuyama ............ G06Q 40/08
(Continued)

OTHER PUBLICATIONS

Rob Hitchens. "Binary Search Trees and Order Statistics for Ethereum", originally published Mar. 2, 2019, 14 pages. (Year: 2019).*

*Primary Examiner* — George C Neurauter, Jr.
(74) *Attorney, Agent, or Firm* — Butzel Long

(57) ABSTRACT

Systems and techniques are provided for a resource stabilization in a distributed network. A computing device in a distributed network may check the median value of a transactional resource in relation to a specified external resource. The computing device in the distributed network may compare the median value of the transactional resource to a threshold value for the transactional resource to determine whether the median value of the transactional resource is above the threshold value or below the threshold value. The supply of the transactional resource in the distributed network may be increased in response to determining that the transactional resource is above the threshold value or may be in response to determining that the transactional resource is below the threshold value.

18 Claims, 13 Drawing Sheets

(51) Int. Cl.
  *G06Q 20/22* (2012.01)
  *G06Q 20/00* (2012.01)
  *G06F 16/22* (2019.01)
  *G06Q 20/36* (2012.01)
  *G06Q 30/08* (2012.01)
  *H04L 12/18* (2006.01)
  *G06Q 40/04* (2012.01)
  *H04L 12/917* (2013.01)
  *H04L 9/06* (2006.01)

(52) U.S. Cl.
  CPC ......... *G06Q 20/065* (2013.01); *G06Q 20/223* (2013.01); *G06Q 20/3678* (2013.01); *G06Q 30/08* (2013.01); *G06Q 40/04* (2013.01); *H04L 9/0637* (2013.01); *H04L 12/1804* (2013.01); *H04L 47/76* (2013.01); *H04L 2209/38* (2013.01); *H04L 2209/466* (2013.01); *H04L 2209/56* (2013.01)

(58) Field of Classification Search
  CPC . H04L 2209/38; H04L 2209/56; G06Q 20/00; G06Q 40/04; G06Q 30/08; G06Q 20/065; G06Q 20/223; G06Q 20/3678; G06F 16/2246
  See application file for complete search history.

(56) References Cited

U.S. PATENT DOCUMENTS

| | | | |
|---|---|---|---|
| 10,679,125 B1* | 6/2020 | Li | A63F 13/67 |
| 2020/0090272 A1* | 3/2020 | Katsuyama | G06Q 40/04 |
| 2020/0118092 A1* | 4/2020 | Gauvreau | G06F 16/2379 |
| 2020/0134721 A1* | 4/2020 | Katsuyama | H04L 47/12 |
| 2020/0311812 A1* | 10/2020 | Kim | G06Q 20/3674 |

* cited by examiner

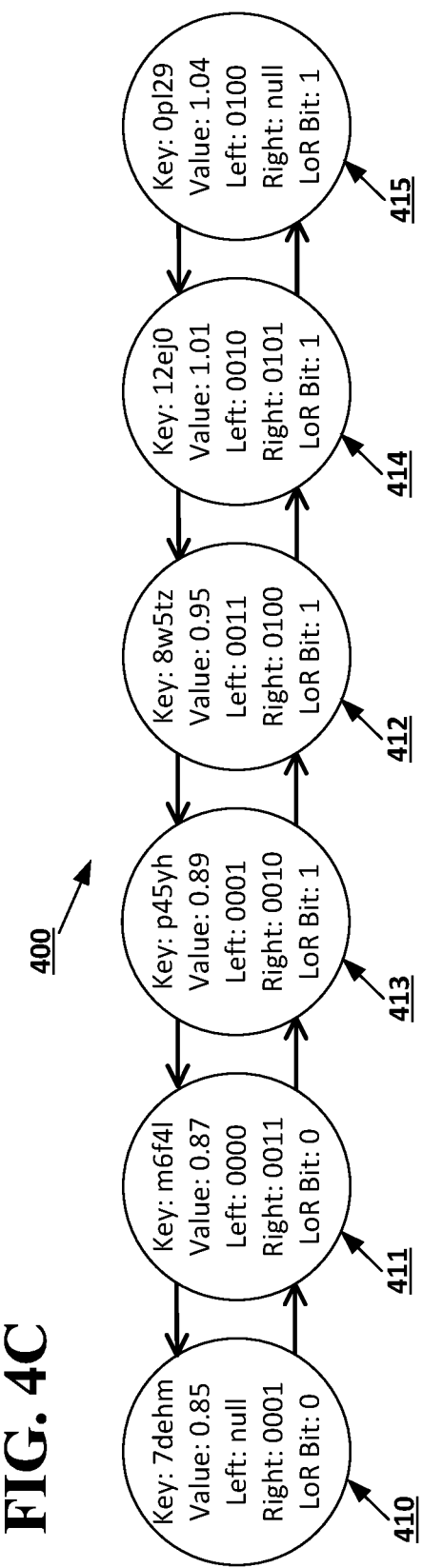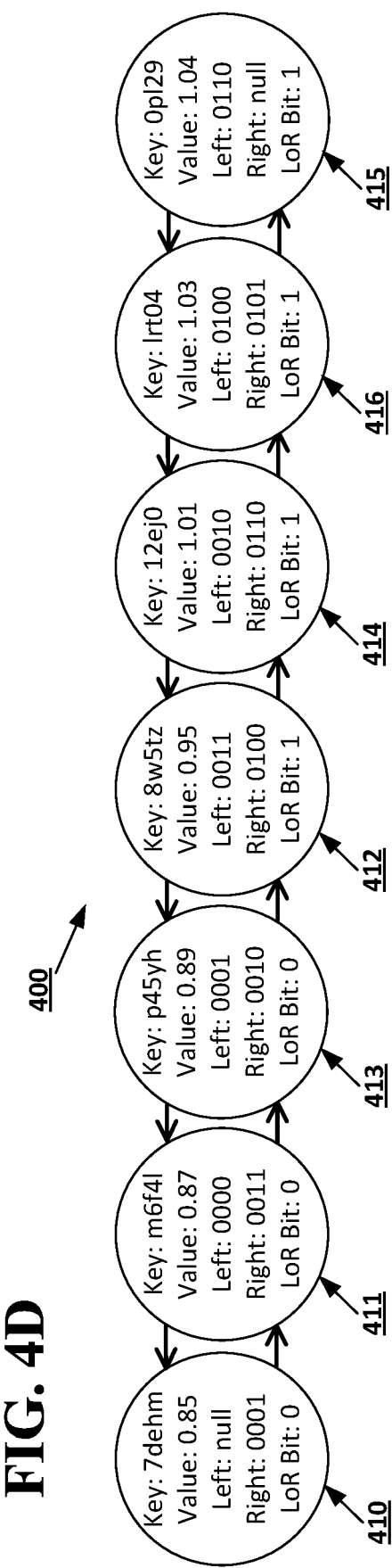

RESOURCE STABILIZATION IN A DISTRIBUTED NETWORK

BACKGROUND

Resources in distributed networks may be volatile. This may be a result of deterministic supply rules that govern the distribution of resources in combination with unpredictable demand for the resources in the distributed network. This may prevent the adoption of resources in distributed networks, such as cryptocurrencies, as a medium of exchange.

BRIEF SUMMARY

In an implementation, computing device in a distributed network may check the median value of a transactional resource in relation to a specified external resource. The computing device in the distributed network may compare the median value of the transactional resource to a threshold value for the transactional resource to determine whether the median value of the transactional resource is above the threshold value or below the threshold value. The supply of the transactional resource in the distributed network may be increased in response to determining that the transactional resource is above the threshold value or may be in response to determining that the transactional resource is below the threshold value.

Systems and techniques disclosed herein may allow for a decentralized database associating public keys and communications addresses. Additional features, advantages, and embodiments of the disclosed subject matter may be set forth or apparent from consideration of the following detailed description, drawings, and claims. Moreover, it is to be understood that both the foregoing summary and the following detailed description are examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

FIG. 4C shows an example doubly linked list suitable for a resource stabilization in a distributed network according to an implementation of the disclosed subject matter.

FIG. 4D shows an example doubly linked list suitable for a resource stabilization in a distributed network according to an implementation of the disclosed subject matter.

DETAILED DESCRIPTION

Figure 1:
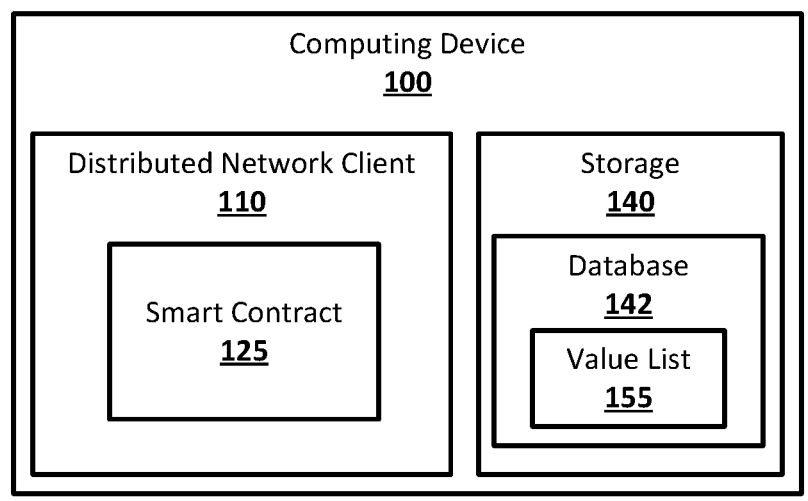
FIG. 1 shows an example system suitable for a resource stabilization in a distributed network according to an implementation of the disclosed subject matter.

According to embodiments disclosed herein, a supply of a first resource in a distributed network may be fixed and a supply of a second resource in the distributed network may be elastic, allowing for the supply of the second resource to be adjusted over time using the first resource, stabilizing the second resource relative to a specified resource external to the distributed network. A fixed supply of the first resource may be established within the distributed network. A portion of the first resource may be distributed after the fixed supply is established, with half of the distributed portion allocated to a reserve and the other half distributed to users of the distributed network in exchange for external resources from other distributed networks. The second resource may be created and distributed until the second resource reaches a threshold value relative to a specified external resource. The second resource may be distributed using an auction in the distributed network, expanding the supply of the second resource, whenever the second resource is above the threshold value. The second resource may also be distributed through the sending of specified amounts of the first resource to the reserve in exchange for the second resource. If the second resource is below the threshold value, the supply of the second resource may be contracted. The supply of the second resource may be contracted through exchanging a third resource in the distributed network for the second resource using an auction. The third resource may be tied to the first resource. The supply of the second resource may also be contracted through the first resource from the reserve being exchanged directly for the second resource. Supplies of the second resource obtained in exchange for the first resource and third resource may be destroyed. Whether the supply of the second resource needs to be expanded or contracted may be based on using a median finder that receives input from oracles to determine whether the second resource is above, below, or at the threshold value relative to the specified external resource. The supply of the second resource may also be expanded and contracted through exchanges of the first resource for the second resource and exchanges of the second resource for the first resource. A specified percentage of the second resource may also be taken from users at specified intervals and exchanged for the first resource, which may be added to the reserve of the first resource. If the reserve of the first resource decreases below a threshold, a specified amount of the first resource in each transfer that uses the first resource may be taken and added to the reserve. The amount of the first resource taken from each transfer may vary with the level of the reserve of the first resource. Governance of the distributed network may be based on the distribution of the first resource and third resource among the users of the distributed network. Amounts of the first resource not distributed initially may be released when a block is mined in the distributed network. The distribution of the first resource based on the mining of a block may be based on the amount of the first resource in reserve at the time the block is mined, and some of the first resource may be added to the reserve if the reserve ratio at the time the block is mined.

The distributed network may be, for example, a network of multiple computing devices and systems that may host a decentralized database. Computing devices and systems may be able to join and leave the distributed network freely. The decentralized database may be, for example, a blockchain database stored in a decentralized manner across multiple different computing devices and systems. The decentralized database may be functionally decentralized, so that no single, central party may store, manage, or maintain the decentralized database. The decentralized database may track control of resources by parties that have accounts in the decentralized database. For example, a party may have an account identified by an address in the decentralized database which may store a record of transactions for that address. The address may be, for example, a cryptographic public key, or may be, for example, a communications address such as an email address or phone number.

The protocol that operates the distributed network may establish a fixed supply of a fixed resource in the distributed network. The supply may be fixed by, for example, a protocol that operates the distributed network. Portions of the fixed supply of the fixed resource may be distributed to accounts in the decentralized database of the distributed network over time. On the initial distribution of the fixed resource a portion, for example, 50% of the distributed fixed resource, may be allocated to a reserve account, or, in some implementations, a smart contract that may act as a reserve account. The remaining distributed fixed resource may be transferred to accounts in the decentralized database in exchange for other resources, such as, for example, a basket of various cryptocurrencies. The cryptocurrencies exchanged for the fixed resource may be held in the reserve account in the decentralized database.

The protocol that operates the distributed network may also establish a supply of a transactional resource. The supply of the transactional resource may be elastic and may be increased or decreased as necessary to maintain the value of the transactional resource at a specified threshold value relative to a specified external resource such as, for example, the US dollar or Euro. For example, the transactional resource may be maintained at a threshold value of 1 unit of the transactional resource to 1 US dollar. The supply of the transactional resource may be expanded when, for example, the value of the transactional resource exceeds the threshold value in order to reduce the value of the transactional resource back to the threshold value. The supply of the transactional resource may be contracted when, for example, the value of the transactional resource falls below the threshold value in order to increase the value of the transactional resource back to the threshold value. There may be a range above and below the threshold value in which the supply of the transactional resource may not be expanded or contracted.

To increase or decrease the supply of the transactional resource, the protocol that operates the distributed network may maintain a second reserve account that includes a supply of the transactional resource and a supply of the fixed resource. The amounts of the transactional resource and the fixed resource in the second reserve account may be adjusted based on the current value of the fixed resource relative to the specified external resource, so that the amount of the transactional resource divided by the amount of the fixed resource equals the value of the fixed resource relative to the specified external resource. This may be done every time a new value is determined for the value of the fixed resource relative to the external resource.

The amount of the fixed resource in the second reserve account may be transferred from the reserve account, and may be some percentage of the amount of the fixed resource in the reserve account that is less than 100%. Once the amount of the fixed resource is added to the second reserve account, the amount of the transactional resource may be added to the reserve account so that the amount of the transactional resource divided by the amount of the fixed resource equals the value of the fixed resource relative to the specified external resource. This may set the exchange rate between the transactional resource and the fixed resource for transactions conducted with the second reserve account to the value of the fixed resource relative to the external resource.

User accounts in the decentralized database, associated with computing devices in the distributed network, may exchange an amount of the transactional resource from their accounts for amounts of the fixed resource from the second reserve account, and may also exchange an amount of the fixed resource from their accounts for amounts of the transactional resource from the second reserve account. For example, the value of the fixed resource relative to the external resource may be 5:1, and the value of the transactional resource may fall below the value of the external resource, for example, at 1:0.95. The second reserve account may be set up with a ratio of 5:1 for the amount of the fixed resource in the second reserve account to the amount of the transactional resource in the second reserve account. This may result in user accounts in the decentralized database exchanging amounts of the transactional resource for amounts of the fixed resource. This may change the ratio of the fixed resource to the transactional resource in the second reserve account, causing the exchange rate used in transactions with the second reserve account to decrease. For example, the ratio may change from 5:1 to 5:1.1, and the exchange rate may change in the same manner. The exchange may reduce the overall supply of the transactional resource in the distributed network outside of the second reserve account, increasing the value of the transactional resource relative to the external resource. The change in exchange rate after the exchange is made with the second reserve account may prevent depletion of the second reserve account.

Similarly, the value of the fixed resource relative to the external resource may be 5:1, and the value of the transactional resource may rise above the value of the external resource, for example, at 0.95:1. The second reserve account may be set up with a ratio of 5:1 for the amount of the fixed resource in the second reserve account to the amount of the transactional resource in the second reserve account. This may result in user accounts in the decentralized database exchanging amounts of the fixed resource for amounts of the transactional resource. This may change the ratio of the fixed resource to the transactional resource in the second reserve account, causing the exchange rate used in transactions with the second reserve account to increase. For example, the ratio may change from 5:1 to 1.004:0.2, and the exchange rate may change in the same manner. The exchange may increase the overall supply of the transactional resource in the distributed network outside of the second reserve account, decreasing the value of the transactional resource relative to the external resource. The change in exchange rate after the exchange is made with the second reserve account may prevent depletion of the second reserve account. The relationship between the amounts of the transactional resource and fixed resource in the second reserve account may be a constant product relationship.

The current value of the fixed resource relative to the specified external resource may be updated at any suitable intervals. Whenever the current value of the fixed resource relative to the specified external resource, the amounts of the transactional resource and the fixed resource in the second reserve account may be updated to reflect the exchange rate implied by the value. The second reserve account may be available for transactions initiated by user accounts in the decentralized database at all times. The second reserve account and the reserve account may be sub-accounts of the same account on the distributed network.

In some implementations, to increase the supply of the transactional resource, the protocol that operates the distributed network may create an additional amount of the transactional resource. The protocol may create the additional amount of the transactional resource in any suitable manner. The newly created amount of the transactional resource may be auctioned, with bids being in the form of a basket of various cryptocurrencies, including, for example, the fixed resource, which may be added to the reserve account. The exchanged amount of the transactional resource may be added to accounts of the decentralized database that belong to parties that submitted winning bids in the auction. Additional amounts of the transactional resource may be created and auctioned until the value of the transactional resource decreases to the threshold value.

To contract the supply of the transactional resource, the protocol that operates the distributed network may auction tokens. The tokens may, for example, entitle the holder to receive an amount of the fixed resource at a time in the future. Bids in the auction for the tokens may be in the form of the transactional resource. Any amount of the transactional resource received in exchange for the tokens at the auction may be destroyed by the protocol, reducing the overall supply of the transactional resource in the distributed network. The received amount of the transactional resource may be destroyed in any suitable manner. For example, the amount of the transactional resource may be transferred to an address for a non-existent account on the decentralized database, rendering the amount of the transactional resource inaccessible. The amount of the transactional resource may also be destroyed through decrementing of the reserve account, for example, by the protocol that operates the distributed network.

If the bids during the auction fall below a threshold value and not enough of the transactional resource has been received to contract the supply of the transactional resource enough to increase the value of the transactional resource above the threshold value for the transactional resource, the protocol may exchange assets from the reserve account for an amount of the transactional resource. For example, cryptocurrencies from the basket of cryptocurrencies received in exchange for the fixed resource and the transactional resource, including fixed resource held in the reserve account, may be exchanged directly for the Celo dollar. The transactional resource amounts received in exchange for assets from the reserve account may be destroyed, reducing the supply of the transactional resource, until enough of the transactional resource has been destroyed to increase the value of the transactional resource above the threshold value for the transactional resource. The auction may be used as an alternative to, or in conjunction with, the second reserve account that includes a supply of the transactional resource and a supply of the fixed resource and with which the transactional resource and the fixed resource can be directly exchanged.

If the amount of the fixed resource held in the reserve account decreases below a threshold amount, a specified amount of the fixed resource in each transfer between accounts in the decentralized database that uses the fixed resource may be taken and added to the reserve. The amount of the fixed resource taken from exchange may vary, for example, based on how the amount of the fixed resource held in the reserve account relative to the threshold amount. For example, the amount taken from each exchange involving the fixed resource may increase as the amount of the fixed resource in the reserve accounts decreases below the threshold amount and may decrease as the amount of the fixed resource in the reserve account increases towards the threshold amount.

A specified percentage of the transactional resource held in accounts in the decentralized database belonging to users may be taken from the accounts at specified intervals and exchanged for the fixed resource, which may be added to the reserve account. At specified intervals, the protocol that operates the distributed network may transfer a specified percentage of the transactional resource held in every account in the decentralized database to the reserve account. The transactional resource may then be exchanged for the fixed resource, for example, through an auction with the users of the distributed network.

Governance of the distributed network may be based on the distribution of the fixed resource and the tokens for the fixed resource among the users of the distributed network. The weight given to any computing device or system in the distributed network in governance decisions is based on the amount of the fixed resource and the tokens for fixed resource held by the user or operator of that computing device or system in an account in the decentralized database. For example, technical improvements to the protocol that operates the distributed network may be proposed by anybody in exchange for an amount of the fixed resource. Whether the technical changes are adopted may be voted on by the computing devices and systems of the distributed network, with the votes weighted by the amount of the fixed resource and the tokens for fixed resource held by the users or operator of the computing devices or systems in accounts in the decentralized database Amounts of the fixed resource not distributed initially may be released when a block is mined in the distributed network. The distribution of the fixed resource based on the mining of a block may be based on the ratio of the fixed resource held in the reserve account at the time the block is mined. If the ratio of the fixed resource held in the reserve account is high, for example, substantially higher than a threshold ratio, the fixed resource may be distributed primarily to users of the distributed network, for example, by being transferred into the users' accounts in the decentralized database. If the ratio of the fixed resource held in the reserve account is low, for example, substantially lower than the threshold ratio, the fixed resource may be distributed primarily to the reserve account. The ratio of the fixed resource distributed to users and the reserve account after a block is mined may vary as the amount of the fixed resource in the reserve account moves farther above or below the threshold ratio. The portion of the fixed resource distributed to users may increase, and the portion distributed to the reserve account may decrease, as the amount of the fixed resource moves farther above the threshold amount. The portion of the fixed resource distributed to users may decrease, and the portion distributed to the reserve account may increase, as the ratio of the fixed resource moves farther below the threshold amount.

Whether the supply of the transactional resource needs to be expanded or contracted may be based on using a median finder to determine whether the transactional resource is above, below, or at the threshold value relative to the specified external resource. The threshold may be a value of the transactional resource relative to a specified external resource such as, for example, the US dollar or Euro. The current value of the transactional resource may be determined by, for example, maintaining a sorted list of reported values for the transactional resource relative to the specified external resource in exchanges that occur using accounts in the decentralized database.

The sorted list may be, for example a doubly linked list of elements. Each element may include a reported value for the transactional resource relative to the specified external resource from an exchange using accounts in the decentralized database. The elements may be generated based on reports from, example, computing devices and systems that have been whitelisted in the distributed network. The whitelisted computing devices and systems may act as oracles for determining the median value of the transactional resource relative to the specified external resource. Each element may include a pair of values, the reported value of the transactional resource based on an exchange, and an identifier for the whitelisted computing device or system reporting the value. The reported value may be stored in the element as a fractional value. The doubly linked list may be a dictionary, with the element key being the identifier for the whitelisted computing device or system reporting the value in the element. Each element of the doubly linked list may also include addresses of the elements to which it is linked on the left and right. Each element of the doubly linked list may also include a timestamp from the whitelisted computing device or system that reported the value in the element, indicating the time the value was reported.

A new element may be inserted into the doubly linked list by a smart contract running on the distributed network. A whitelisted computing device or system that reports a value may also provide the keys of the elements that the new element with the reported value should be inserted between. The smart contract may ensure that the element is inserted so that the reported value in the element is in between the reported values of the elements to the inserted element's left and right. This may maintain the doubly linked list as sorted by the reported values in the elements of the doubly linked list.

Elements in the doubly linked list may be updated when a whitelisted computing device or system that has already reported a value reports another value. The identifier for the whitelisted computing device or system may be the key used to lookup the element for the previously reported value in the doubly linked list. The element may then be updated with the newer value from the whitelisted computing device or system. The smart contract may ensure that the newer value in the updated element is still in between the reported values of the elements to the inserted element's left and right, reinserting the updated element at a different location in the doubly linked list if necessary to maintain proper sorting of the doubly linked list.

The doubly linked list may be used to find the median reported value of the transactional resource among the elements received from the whitelisted computing devices and systems. For example, the key of the element that includes the median value in the doubly linked list may be public, for example, stored in a publicly accessible variable, allowing for fast lookup of the median value. Each element in the doubly linked list may include a bit that may specify whether that element is to the right or left of the element with the median value in the doubly linked list. Whenever a new element is added to the doubly linked list or an element is reinserted into the doubly linked list, which element's key is made public may be changed. For example, if an element that was to the right of the current element with the median value is updated and reinserted to the left of the current element with the median value, an element that is linked on the left of the current element with the median value may become the new element with the median value, and its key may be made public. If an element is added to the doubly linked list to the left of the element with the median value, and this results in the doubly linked list having an odd number of elements, and a the previously inserted element was also inserted to the left of the element with the median value, an element that is linked on the left of the current element with the median value may become the new element with the median value, and its key may be made public. This may allow the median value to remain updated and to be looked up in constant time when determining whether to expand or contract the supply of the transactional resource.

The auctions used to expand or contract the supply of the transactional resource may be implemented as, for example, balanced binary search auctions. A multi-unit auction protocol for smart contracts may be implemented in the distributed network. The auctioneer, for example, a smart contract running in the distributed network, may declare a cap on how many units will be sold at the auction. The units may be, for example, the transactional resource being auctioned to expand the supply of the transactional resource, or tokens being auctioned to contract the supply of the transactional resource. Bidders may submit bids stating how much they're willing to pay per unit and how many units they wish to purchase. For example, bids for the transactional resource may be made using cryptocurrencies, including, for example, the fixed resource, and bids for the tokens may made using the transactional resource. The bids may then be filled from highest to lowest price per unit, or exchange rate, until the cap set by the auctioneer is reached.

An interface for a smart contract for a multi-unit auction may be implemented as:

```
interface IAuction {
    function startBidding(uint cap) external;
    function makeBid(uint sellAmount, uint buyAmount) return
        (uint bidId);
    function endBidding( ) external;
    function fillBid(uint bidId) external;
}
```

This interface may be for a two-phase, open-bid auction, but may also be modified to be a hidden bid auction by adding a commit step.

The auction owner, or auctioneer, which may be, for example, the smart contract running in the distributed network, may start an auction. For example, the smart contract may call a startBidding function when an auction is to be started to, for example, auction off some amount of the transactional resource or the tokens. Bidders, who may be, for example, users of the computing devices and systems in the distributed network, may make their bids by calling, for example, a makeBid function. The bids may be made using, for example, cryptocurrencies, including, for example, the fixed resource and the transactional resource. After a specified amount of time, an endBidding function may be called by the auctioneer, for example, the smart contract. Bidders may start calling a fillBid function to have their bids filled or to withdraw any cryptocurrency or amount of the fixed resource or the transactional resource that the bidder committed if their bid didn't fit under the auctioneer's cap for the auction.

Attempting to sort all of the received bids in a multi-unit auction by decreasing sellAmount/buyAmount exchange rates may take quasilinear time, O(n log n), making it too computationally expensive for the auctioneer, for example, the smart contract, to perform on a single computing device or system when there is a large number of bidders, for example, thousands or millions of bidders. The sorting may be broken into chunks, and each of the bidders in the auction may pay for the computation required to sort their own bid. This may result in each of the n participants, or bidders, in the auction paying for a logarithmic time computation, O(log n), instead of having a single party pay for a quasi-linear time computation, O(n log n).

This may be accomplished by storing the bids in a balanced binary search tree, such as, for example, a red-black tree. Insertions to a balanced binary search tree may have a logarithmic computational cost, and after each insertion, an in-order traversal of the balanced binary search tree may result in a sorted list. This may be implemented as:

```
contract Auction {
    struct Node {
        uint sellAmount;
        uint buyAmount;
        uint left;
        uint right;
        uint parent;
        bool red;
    }
    Node[ ] tree;
    uint root;
    function greaterThan(Node n1, Node n2) {
        return n1.sellAmount * n2.buyAmount >= n1.buyAmount *
            n2.sellAmount;
    }
    function makeBid(uint sellAmount, uint buyAmount) payable return (uint
        bidId) {
        bidId = tree.length;
        tree.push(Node(sellAmount, buyAmount, 0, 0, 0, false));
        ... // do RBT insertion with greaterThan as the comparison function
    }
    ...
}
```

To determine whether a particular bid fits under the cap for an auction, the balanced binary search tree may be traversed from the maximal bid, the bid with the best exchange rate, to the particular bid, summing all of the buyAmounts along the away. If the particular bid is reached before the sum surpasses the cap, the particular bid may be accepted, otherwise, there were enough bids at better exchange rates before the particular bid to fill up the cap for the auction and the particular bid may not be accepted. However, this computation may take linear time, O(n), which may make it too computationally expensive for an individual bidder to perform on their computing device or system that is part of the distributed network.

To reduce computational costs for individual bidders, the balanced binary search tree may be augmented by having each node of the tree store the total sum of the buyAmounts in the node's subtree. This datum may be updated when a new node is inserted into the balanced binary search tree and when the balanced binary search tree is rebalanced. For a red-black binary search tree, the insert and rotation operations may be modified as:

```
function insert(Bid bid, uint64 bidId) {
    uint64 current = tree.root;
    uint64 parent = current;
    while (current != 0) {
        parent = current;
        // Increase totals on the path from root to newly inserted node
        tree.[parent].total = tree[parent].total + bid.buyAmount;
        if (greaterThan(bid, tree.bids[current])) {
            current = tree.bids[current].left;
        } else {
            current = tree.bids[current].right;
        }
    }
    bid.parent = parent;
    if (greaterThan(bid, tree[parent])) {
        tree.bids[parent].left = bidId;
    } else {
        tree.bids[parent].right = bidId;
    }
}
function recalculateTotalsAfterRotation(uint n, uint pivot) {
    tree[pivot].total = tree[n].total;
    tree[n].total = tree[tree.bids[n].left].total +
        tree[tree[n].right].total +
        tree[n].buyAmount
}
```

An augmented balanced binary search tree having each node store the total sum of the buyAmounts in the node's subtree may allow for a logarithmic time, O(log n), algorithm for checking how much of the cap for the auction will be taken up by bidders who bid at higher exchange rates than some other particular bid. The balanced binary search tree may be walked from the node for the particular bid to the root. Any time a step up is made from a right child, the total from the sibling's subtree and parent node's butAmount may be added, as:

```
function totalFromHigherExchangeRates(uint bidId) view returns (uint) {
    uint total = tree[tree[bidId].left].total;
    uint parent = tree[bidId].parent;
    uint currentNode = bidId;
    while (parent != 0) {
        if (tree[parent].right == currentNode) {
            total += tree[tree[parent].left].total;
            total += tree[parent].buyAmount;
        }
        currentNode = parent;
        parent = tree[parent].parent;
    }
return total;
}
```

The auction conducted in the distributed network may be a uniform price auction, where each winning bidder may pay the same price, which may be the price of the last winning bid that fit under the cap for the auction. The multi-unit auction may be modified to be a uniform price auction through an additional step before the filling of bids. The additional step may involve one of the parties in the auction providing to the smart contract for the auction the index of the last winning bid that fit under the auction cap. The index may be, for example, an index to an entry on a blockchain. The index may be easy to find off-chain and its correctness may be verified on-chain, for example, through a call to totalFromHigherExchangeRates. Once the index of the last, and lowest, winning bid has been found, provided to the smart contract, and verified, the price of the lowest winning bid may be remembered and used to refund bidders when the winning auction bids are filled.

The auction conducted in the distributed network may be a generalized second price auction, where each winning bidder pays the price that was bid by the next lowest bidder, so that the highest bidder pays the price that was bid by the second highest bidder, who pays the price bid by the third highest bidder, and so on. The multi-unit auction may be modified to be a generalized second price auction by setting the buyAmount of each bid to 1, so that totalFromHigherExchangeRates returns the slot assigned to a bidder. On filling the winning bids, the balanced binary search tree may be searched by a winning bidder in logarithmic time to determine the next highest bid to their bid, which is then the price that winning bidder may pay.

The auction conducted in the distributed network may be a blind auction, where the bids may be sealed. The multi-unit auction may be modified to be a blind auction with a three-phase structure of commit, reveal, and fill. The amount committed by a bidder may not reveal if they are asking for high volume at a low price or a low volume at a high price.

The auction conducted in the distributed network may be a balanced binary search tree auction that may be a blind, or sealed-bid, auction run in 3 stages, commit, reveal, and fill. Each stage may last a specified amount of time. During each stage, only one type of action may be performed by the bidders participating in the auction. For example, once the commit stage ends and the reveal stage is entered, bidders may only reveal valid bids, may no longer commit to bids and may not yet be allowed to fill their bids. An augmented balanced binary search tree may be used while handling bids during the reveal and fill stages of the balanced binary search tree auction.

The commit stage may provide for the hiding of bids for the sealed-bid property. Bidders may submit cryptographic hashes of their bids together with a commitment of whichever cryptocurrency, including, for example, the fixed resource or the transactional resource, may be used to pay for their bids.

In the reveal stage, a bidder may reveal their bid parameters. It may be necessary that these parameters correspond to the hiding provided in the commit phase, and that the amount to exchange be less than or equal to the amount of cryptocurrency committed by the bidder. In order to keep the bids sorted, the bids may be inserted into a balanced binary search tree, such as, for example, a red-black tree. The exchange rate in the bid may be used as the value with respect to which the tree is ordered. To later know which bids fit within the cap, the balanced binary search tree may be augmented so that each node of the balanced binary search tree may also keep track of the amount of the auctioned-off resource in its subtree.

In the fill stage, IOUs may be written for bidders. For bids that fit under the cap for the auction, bidders may be allowed to withdraw an appropriate amount of the transactional resource or the tokens that the auction was selling, for example, transferring the transactional resource or the tokens to the user's account in the decentralized database of the distributed network. For bids that did not fit under the cap, users may be refunded their committed cryptocurrencies.

To determine whether a bid fits under the cap or not, the balanced binary search tree may be traversed upwards from the bid's node to the root, collecting the total amount of cryptocurrency in bids at better exchange rates from nodes during the traversal. There may be a bid that fits partially under the cap. This bid may be partially filled, such that part of the committed amount may be traded at the desired exchange rate and the rest may be refunded. The reveal and fill phases may incur only a logarithmic computation cost, allowing a balanced binary search tree auction to scale to millions of participants.

The distributed network may support additional cryptocurrencies, which may have their threshold values checked against any additional specified external resources. For example, the distributed network may support the transactional resource, which may have its threshold value checked relative to the US dollar, and a secondary transactional resource, which may have its threshold value checked relative to the Euro. The fixed resource may be used in the same manner with respect to the transactional resource, the transactional resource, and any other cryptocurrency in the distributed network that has its threshold value checked against an additional specified external resource. For example, the fixed resource may be exchanged for the secondary transactional resource in the same manner as the transactional resource.

FIG. 1 shows an example system suitable for a resource stabilization in a distributed network according to an implementation of the disclosed subject matter. A computing device 100 may include a distributed network client 110 and a storage 140. The computing device 100 may be any suitable computing device, such as, for example, a computer 20 as described in FIG. 13, or component thereof, for implementing the distributed network client 110 and the storage 140. The computing device 100 may be a single computing device, or may include multiple connected computing devices, and may be, for example, a laptop, a desktop, an individual server, a server farm, or a distributed server system, or may be a virtual computing device or system. The computing device 100 may be part of a computing system and network infrastructure, or may be otherwise connected to the computing system and network infrastructure. The computing device 100 may be, for example, a computing device or system that may participate in a distributed network that includes a decentralized database. The distributed network client 110 may be any suitable combination of hardware and software on the computing device 100 for interacting with and performing functions related to the distributed network and decentralized database, which may be, for example, a blockchain database stored across multiple computing devices. The storage 140 may be any suitable combination of hardware and software for storing data, including any suitable volatile and non-volatile storage.

The distributed network client 110 may be any suitable combination of hardware and software on the computing device 100 for interacting with and performing functions related to the distributed network and decentralized database. The decentralized database may be a blockchain database. The distributed network client 110 may allow for the computing device 100 to interact with, and be a part of, the decentralized database. For example, the distributed network client 110 may maintain a copy of the decentralized database in the storage 140 of the computing device 100. The distributed network client 110 may, for example, include the protocol that operates the distributed network, which may run on the computing device 100 as part of the distributed network client 110. The protocol may, for example, create and distribute the fixed resource, create and auction the transactional resource, and create and auction the tokens. The distributed network client 110 may run smart contracts in the distributed network, such as the smart contract 125 that may, for example, maintain the doubly linked list of elements including reported values for the transactional resource, check the median value of the transactional resource on the doubly linked list, and initiate and conduct auctions to expand or contract the supply of the transactional resource based on the media value of the transactional resource. The protocol, as a part of the distributed network client 110, may also be responsible for implementing transfers of a specified percentage of the fixed resource from exchanges that use the fixed resource based on the amount of the fixed resource held in a reserve account in the decentralized database, and transfers of a specified percentage of the transactional resource from accounts in the decentralized database to the reserve account before exchanging the transactional resource for the fixed resource through, for example, an auction.

The storage 140 may store a database 142. The database 142 may be, for example, a copy of the blockchain of the decentralized database. The database 142 may be stored as, for example, a series of blocks. The database 142, as stored on the computing device 100, may be a complete copy of the blockchain of the decentralized database including all blocks written to the blockchain since its inception. The database 142 may include records of all transactions involving the transactional resource, the fixed resource, and tokens that have occurred between accounts in the decentralized database. The database 142 may also include, for example, the value list 155, which may include reported values for the transactional resource received from whitelisted computing devices and systems in the distributed network. The value list 155 may be in the form of, for example, a doubly linked list.

Figure 2:
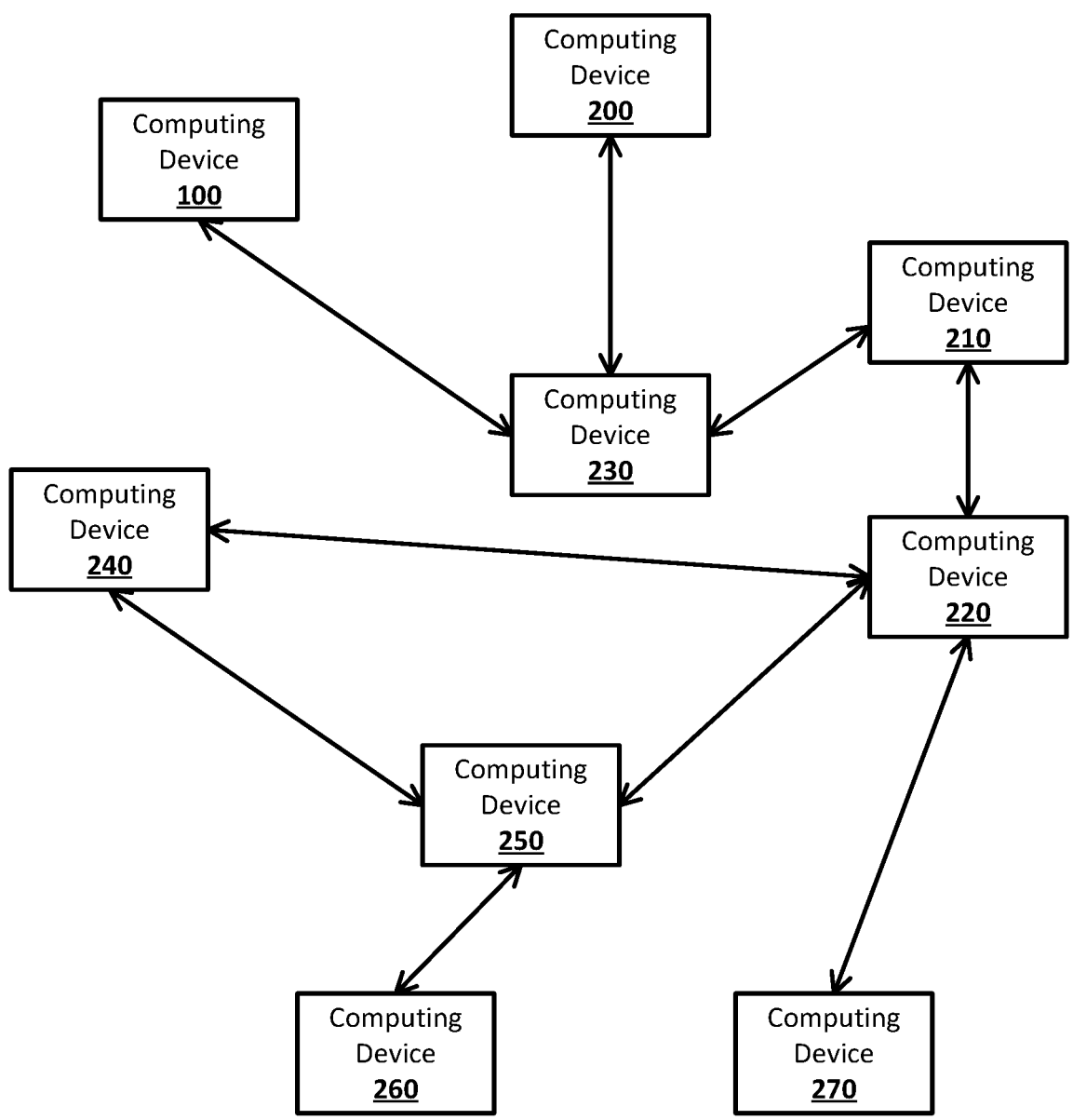
FIG. 2 shows an example arrangement suitable for a resource stabilization in a distributed network according to an implementation of the disclosed subject matter.

FIG. 2 shows an example arrangement suitable for a resource stabilization in a distributed network according to an implementation of the disclosed subject matter. The distributed network may be a peer-to-peer network that may include several computing devices and systems, including, for example, the computing device 100, computing device 200, computing device 210, computing device 220, computing device 230, computing device 240, computing device 250, computing device 260, and computing device 270. The computing devices 200, 210, 220, and 230, 240, 250, and 260 may be any suitable computing devices or systems similar to the computing device 100, and may, for example, each store a complete copy of the database 142, which may be a blockchain that stores the decentralized database of the distributed network. The computing devices of the distributed network may each run a distributed network client, such as the distributed network client 110. This may ensure that all of the computing devices and systems in the distributed network operate within the distributed network using the same protocol. Any of the computing devices and systems of the distributed network may be whitelisted, for example, acting as oracles, for reporting the value of the transactional resource from transfers involving the transactional resource. For example, if the computing devices 200, 210, and 220 are whitelisted, the computing devices 200, 210, and 220 may report values of the transactional resource from transfers involving the transactional resource by sending elements to the value list 155, which may be maintained by, for example, the smart contract 125.

The computing devices of the distributed network may be connected in any suitable manner, allowing communication between any two computing devices of the distributed network. For example, computing devices may be connected through any combination of public networks, such as the Internet, and private networks. Communication may occur directly between any two computing devices, such as, for example, between the computing device 100 and the computing device 230, or may be passed through computing devices, such as, for example, between the computing device 100 and the computing device 210 through the computing device 230. Computing devices may join and leave the distributed network at any time, for example, through enabling and disabling of the distributed network client. Users associated with the computing devices may have accounts in the decentralized database stored in the blockchain of the database 142, which may track transfers of cryptocurrencies, including the transactional resource, the fixed resource, and tokens, between accounts.

Figure 3:
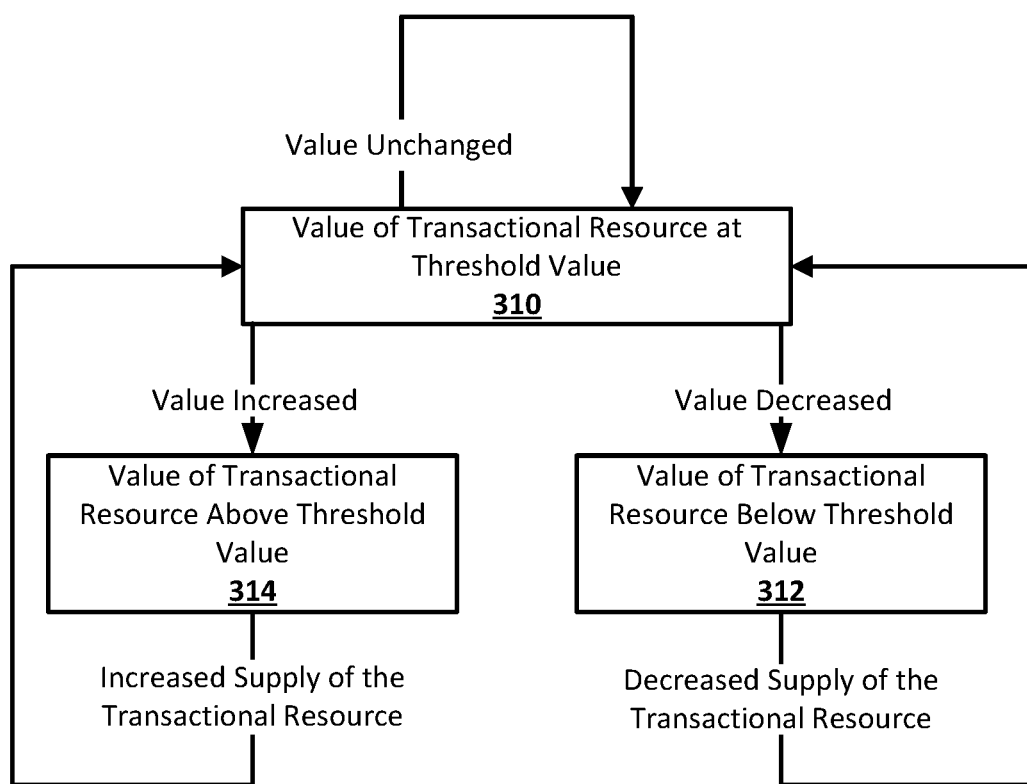
FIG. 3 shows an example state diagram suitable for a resource stabilization in a distributed network according to an implementation of the disclosed subject matter.

FIG. 3 shows an example state diagram suitable for a resource stabilization in a distributed network according to an implementation of the disclosed subject matter. In state 310, the value of the transactional resource may be at the threshold value. In state 312, the value of the transactional resource may be below the threshold value. In state 314, the value of the transactional resource may be above the threshold value.

When in the state 310, the value of the transactional resource may be checked, for example, by the smart contract 125 using a key of an element of the value list 155 that has been made public and includes the median value of the transactional resource as reported by whitelisted computing devices and systems of the distributed network. If the value of the transactional resource is unchanged, for example, is still at the threshold value, or is changed but still within a specified range of the threshold value, the state may remain the same. If the value of the transactional resource has decreased, the state may transition to the state 312. If the value of the transactional resource has increased, the state may transition to the state 314.

When in the state 312, the value of the transactional resource may be increased by decreasing the supply of the transactional resource. For example, an amount of tokens may be distributed by, for example, an auction in which users of the distributed network may submit bids using the transactional resource held by the users in accounts in the decentralized database. The auction may be initiated and conducted by, for example, the smart contract 125. The transactional resource of the winning bids may be exchanged for amounts of the tokens through transfers between accounts in the decentralized database. The amount of the transactional resource collected in exchange for the tokens may be destroyed in any suitable manner. For example, the amount of the transactional resource may be transferred to an address that does not correspond to an account in the decentralized database, rendering the amount of the transactional resource inaccessible. The supply of the transactional resource may be decreased until, for example, the smart contract 125 determines that the value of the transactional resource has returned to the threshold value based on the median reported value of the transactional resource in the value list 155. This may result in a return to the state 310, where the value of the transactional resource is at the threshold value. If the transactional resource has not returned to the threshold value after the tokens are auctioned, and the bids during the auction fell below a threshold value, cryptocurrencies from the reserve account, including the fixed resource, may be exchanged for the transactional resource directly, outside of any auction. The transactional resources received in direct exchange for the cryptocurrencies and the fixed resource from the reserve account may also be destroyed. This may continue until the smart contract 125 determines that the transactional resource has returned to the threshold value, returning the state to the state 310.

When in the state 314, the value of the transactional resource may be decreased by increasing the supply of the transactional resource. For example, an additional amount of the transactional resource may be created in the distributed network. The additional amount of the transactional resource may be created by, for example, an operation of the protocol that operates the distributed network. The additional amount of the transactional resource may be distributed by, for example, an auction in which users of the distributed network may submit bids using cryptocurrencies including the fixed resource held by the users in accounts in the decentralized database. The cryptocurrencies, such as the fixed resource, of the winning bids may be exchanged for amounts of the newly created transactional resource through transfers between accounts in the decentralized database of the database 142 and through transfers between other, external accounts. The supply of the transactional resource may be increased until, for example, the smart contract 125 determines that the value of the transactional resource has returned to the threshold value based on the median reported value of the transactional resource in the value list 155.

Figure 4A:
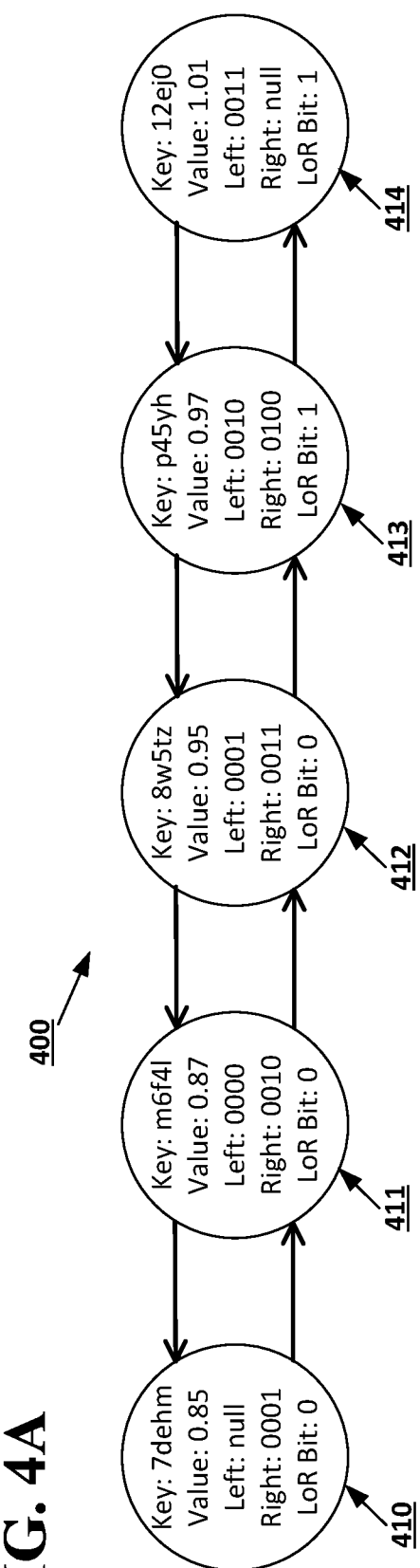
FIG. 4A shows an example doubly linked list suitable for a resource stabilization in a distributed network according to an implementation of the disclosed subject matter.

FIG. 4A shows an example doubly linked list suitable for a resource stabilization in a distributed network according to an implementation of the disclosed subject matter. The smart contract 125 may include a median finder. The median finder may be used to determine when the transactional resource is above, below, or at the threshold value relative to the specified external resource. The median finder may read a median reported value of the transactional resource from an element of a doubly linked list 400, which may serve as the value list 155.

The doubly linked list 400 may include elements 410, 411, 412, 413, and 414. Each of the elements 410, 411, 412, 413, and 414 may include a reported value of the transactional resource from a whitelisted computing devices or system of the distributed network, such as, for example, the computing devices 210 and 220. For example, the computing device 210 may exchange an amount of the transactional resource for an amount of the specified external resource, and may report the value of the transactional resource, or exchange rate, used in the exchange. The whitelisted computing device or system may include, along with reported value, a key that identifies the whitelisted computing device or system, and the keys of the elements of the doubly linked list 400 that the new element with the reported value should be inserted between. The smart contract 125 may ensure that new element is inserted into the doubly linked list 400 at the proper location. For example, the smart contract 125 may check the values in the elements whose keys were provided by the reporting whitelisted computing device or system to ensure that the reported value of the new element is between the values in those elements. In some cases, the positions of the elements whose keys were provided by the reporting whitelisted computing device or system may change before the new element is inserted. The insertion may proceed if one of the elements whose key was provided is still in the same position relative to the new element, for example, the element indicated to be linked on the left of the new element would still be linked on the left of the new element. The insertion may fail if the position of both elements has changed such that the element indicated to be linked on the left would no longer be linked on the left of the new element and the element indicated to be linked to the right of the new element would no longer be linked to the right of the new element. For example, two elements may have been inserted in between the elements whose keys were provided, such that the new element belongs directly in between the two inserted elements, or the elements whose keys were provided may have been moved due to changes in their values, or there may be a combination of elements being moved and inserted.

Each element may include a key, a value, a left address, a right address, and a LoR bit. The key may indicate the computing device or system that reported the value in the element. For example, the element 412 may include a value reported by the computing device 210, which may be whitelisted and may have a key of "8w5tz" that may uniquely identify the computing device 210 in the distributed network.

The value may be the reported value of the transactional resource from the exchange. For example, the value of the transactional resource relative to the specified external resource in the exchange reported by the computing device 210 may be 0.95.

The left address and right address of an element may be the addresses of the elements to which the element is linked on its left and right. For example, the element 412 may be linked to the element 411 on the left and the element 413 on the right. The element 412 may include 0001 as its left address, which may be the address of the element 411, and may include 0011 as its right address, which may be the address of the element 413.

The LoR Bit may indicate whether an element is to the left or the right of the element of the doubly linked list 400 that includes the median value. For example, the first element added to the doubly linked list 400 may be the element with the median value by default. If the second element added to the doubly linked list 400 has a value lower than the value of the first element, the second element may be added to the left of the first element and may have its LoR Bit set to 0 to indicate that it is to the left of the element with the median value. If the third element added to the doubly linked list 400 has a value lower than the value of the second element, the third element may be added to the left of the second element. This may result in the element with the median value changing from the first element to the second element. The LoR Bit of the first element may be set to 1, indicating that it is to the right of the element with the median value, and the LoR Bit of the third element may be set to 0, indicating that it is to the left of the element with the median value. The LoR Bits of the elements may be changed as necessary as new elements are added to the doubly linked list 400 and which element has the median value changes. Which element has the median value may change whenever, for example, two elements in a row are added to the same side, either left or right, of the current element with the median value, and there are an odd number of elements in the doubly linked list 400. For example, adding two elements to the left of the current element with the median value may result in an element linked to the left of the current element with the median value becoming the new element with the median value if there are an odd number of elements in the doubly linked list.

The key of the element of the doubly linked list 400 with the median value may be stored as a public variable in the decentralized database of the database 142. This may allow for the median finder of the smart contract 125 to determine the median value of the transactional resource in constant time, as it may only need to access the element via the public key. The key stored as the public variable may change whenever there is a change in which element of the doubly linked list 400 includes the median value.

Figure 4B:
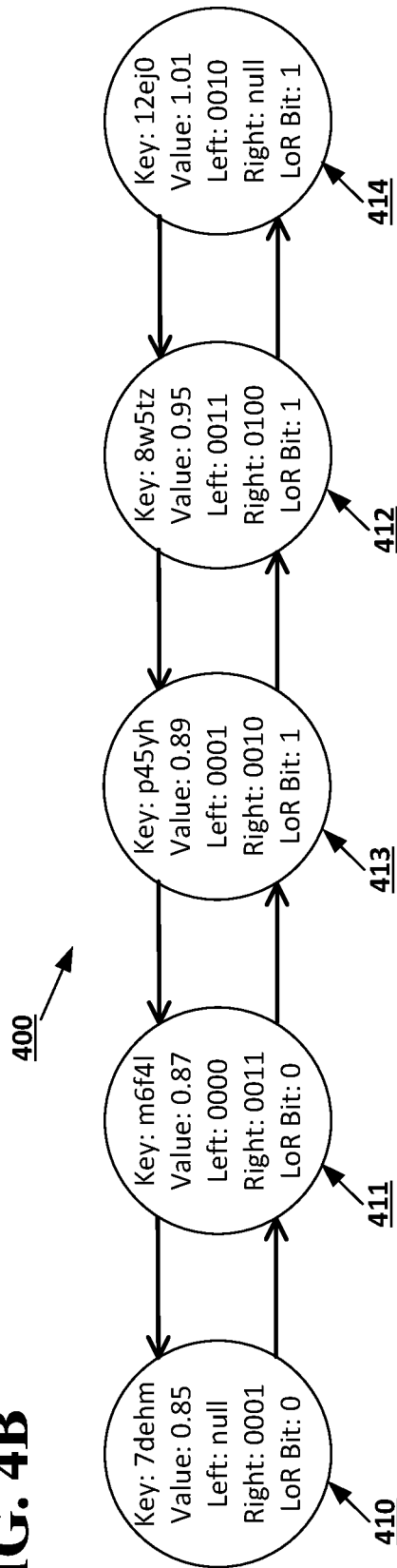
FIG. 4B shows an example doubly linked list suitable for a resource stabilization in a distributed network according to an implementation of the disclosed subject matter.

FIG. 4B shows an example doubly linked list suitable for a resource stabilization in a distributed network according to an implementation of the disclosed subject matter. The value stored in an element of the doubly linked list 400 may change. For example, the element 413 may store a value reported by the computing device 250, which may be identified by the key "p45yh". The computing device 250 may have previously reported a value for the transactional resource of 0.97. The computing device 250 may subsequently report a value for the transactional resource of 0.89. The computing device 250 may provide this value to the smart contract 125 along with its key, "p45yh", and the key of the element that should be to the left of the updated element 413, "m6f41" for the element 411, and the key of the element that should be to the right of the updated element 413, "8w5tz" for the element 412. The smart contract 125 may remove the element 413 from its current location in the doubly linked list 400, update it with the value 0.89, and reinsert it in between the elements 411 and 412, updating the left and right addresses for the elements 411, 412, 413, and 414 as necessary. The LoR Bit of the element 412 may be updated to 1, and the public variable may be updated to reflect that "p45yh" is the key of the element with the median value, replacing "8w5tz."

FIG. 4C shows an example doubly linked list suitable for a resource stabilization in a distributed network according to an implementation of the disclosed subject matter. The element 415 may be added to the doubly linked list 400 based on a report from, for example, the computing device 260, which may be a whitelisted computing device or system for the distributed network. The element 415 may have a value of 1.04, which may result in the element 415 being added to the right end of the doubly linked list 400. The addition of the element 415 may not result in a change to which element of the doubly linked list 400 has the median value, which may remain the element 413.

FIG. 4D shows an example doubly linked list suitable for a resource stabilization in a distributed network according to an implementation of the disclosed subject matter. The element 416 may be added to the doubly linked list 400 based on a report from, for example, the computing device 270, which may be a whitelisted computing device or system for the distributed network. The element 416 may have a value of 1.03, which may result in the element 416 being inserted into the doubly linked list 400 between the element 414 and the element 415. The addition of the element 416 may result in a change to which element of the doubly linked list 400 has the median value, from the element 413 to the element 412 that is the right linked element for the element 413. The LoR Bit of the element 413 may be set to 0, as the element 413 may now be to the left of the element with the median value, the element 412.

Figure 5:
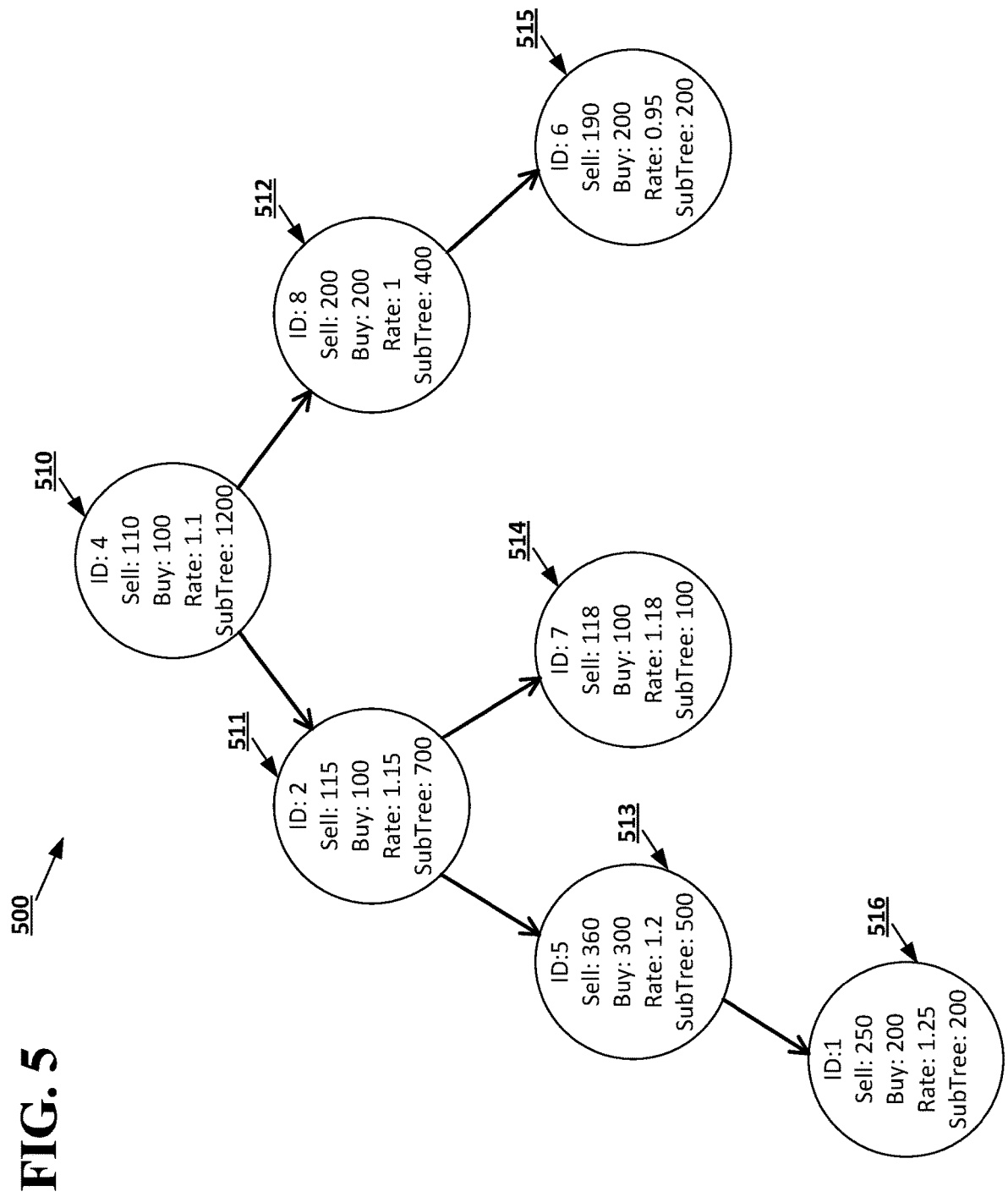
FIG. 5 shows an example balanced binary search tree suitable for a resource stabilization in a distributed network according to an implementation of the disclosed subject matter.

FIG. 5 shows an example balanced binary search tree suitable for a resource stabilization in a distributed network according to an implementation of the disclosed subject matter. When an auction is conducted, for example, by the smart contract 125, received bids may be placed into a balanced binary search tree 500. For example, when the supply of the transactional resource is being contracted, as in the state 312, the smart contract 125 may conduct an auction in which users of computing devices and systems in the distributed network may place bids for tokens using the transactional resource. Each bid may include a sell amount, for example, the amount of the transactional resource being bid, and a buy amount, for example, the amount of the tokens the bidder is bidding for. The ratio between the sell amount and the buy amount may be the exchange rate for the bid. Each bid may also include a ID, which may be a bid ID that allows the computing device or system that submitted the bid to identify which node of the balanced binary search tree 500 includes the bid.

All of the bids submitted during an auction may be inserted in the balanced binary search tree 500 ordered by exchange rate. Each of the computing devices and systems of the distributed network that submits a bid may perform an insertion operation to insert that bid into the balanced binary search tree 500. For example, if the computing device 210 submitted a bid in the auction being conducted by the smart contract 125, the computing device 210 may perform the insertion operation that inserts a node for the bid, for example, the node 514, into the balanced binary search tree 500 and maintains the sorting and balance of the balanced binary search tree 500. This may result in the computation needed to create the balanced binary search tree 500 and maintain its sorting and balance being distributed among the computing devices and system that submit bids during the auction, rather than being performed on a single computing device or system of the distributed network. At the end of bidding, the balanced binary search tree 500 may include one node for each submitted bid, with all nodes sorted by exchange rate.

Each node of the balanced binary search tree 500 may include the total of the buy amounts from the nodes of its subtrees, including its own buy amount. This subtree totals may be updated for the parent nodes of an inserted node each time a node is inserted into the balanced binary search tree 500. The subtree totals may be updated by, for example, same computing device or system that inserted the node. For example, when the computing device 210 inserts the node 514 into the balanced binary search tree 500, the computing device 210 may update the subtree totals of the nodes 510 and 511 by adding the buy amount from the node 514 to the subtree totals in the nodes 510 and 510.

Each computing device and system that submitted a bid may then determine whether its bid fits under a cap for the auction. For example, the smart contract 125 may auction an amount of the transactional resource and may set a cap of 800. Bids may be filled in order from highest exchange rate to lowest rate until the cap is filled. To check whether its bid fits under the cap, a computing device or system that submitted a bid may determine the total buy amounts of bids with a better exchange rate than the bid the computing device or system submitted. The balanced binary search tree 500 may be sorted so that the left child of a node has a higher exchange rate than both the node and the right child of the node. The computing device or system may start at the node for its bid in the balanced binary search tree 500 and traverse the balanced binary search tree 500 to the root. The total buy amount at better exchange rates may start with subtree total of the left subtree of the node for the bid. If the node for the bid is the right child of its parent node, the total from the subtree total from the left child of the parent node and the buy amount of the parent node itself may be added to the total buy amount at better exchange rates. This may then be repeated at the parent node until the parent node of the balanced binary search tree 500 is reached. This may allow for the determination of whether a bid fits under an auction cap to be made in logarithmic time. Each computing device or system that submitted a bid may perform the computation to determine whether its bid fit under the auction cap.

For example, the computing device 250 may submit the bid stored in the node 514. To determine the total buy amount at better exchange rates, and whether the bid in the node 514 will fit under the cap of, for example 800, the computing device 250 may start at the node 514. The node 514 may have no left child node, so the total buy amount may start at 0. The computing device 250 may traverse the balanced binary search tree 500, stepping up from the node 514 to the node 511. Since the node 514 is the right child node of the node 511, the subtree total of the left child node of the node 511, the node 513, may be added to the total amount buy amount along with the buy amount of the node 511 itself. This may increase the total buy amount at better exchange rates to 600. The computing device 250 may again step up from the node 511 to its parent node, the node 510. Since the node 511 is the left child of the node 510, no additions may be made to the total buy amount at better exchange rates. The computing device 250 may determine that it cannot step up from the node 510, which may be the parent node of the balanced binary search tree 500, resulting in a total buy amount at better exchange rates of 600. The buy amount of the bid in the node 514 may be 100 and may fit under the cap of 800. The computing device 250 may complete collect on its bid, for example, exchanging 118 of the specified external resource for 100 of the transactional resource.

The balanced binary search tree 500 may be stored in the distributed network in any suitable manner. For example, the balanced binary search tree 500 may be stored as part of the database 142 in each of the computing devices in the distributed network, or in each of the computing devices participating in the auction.

Figure 6:
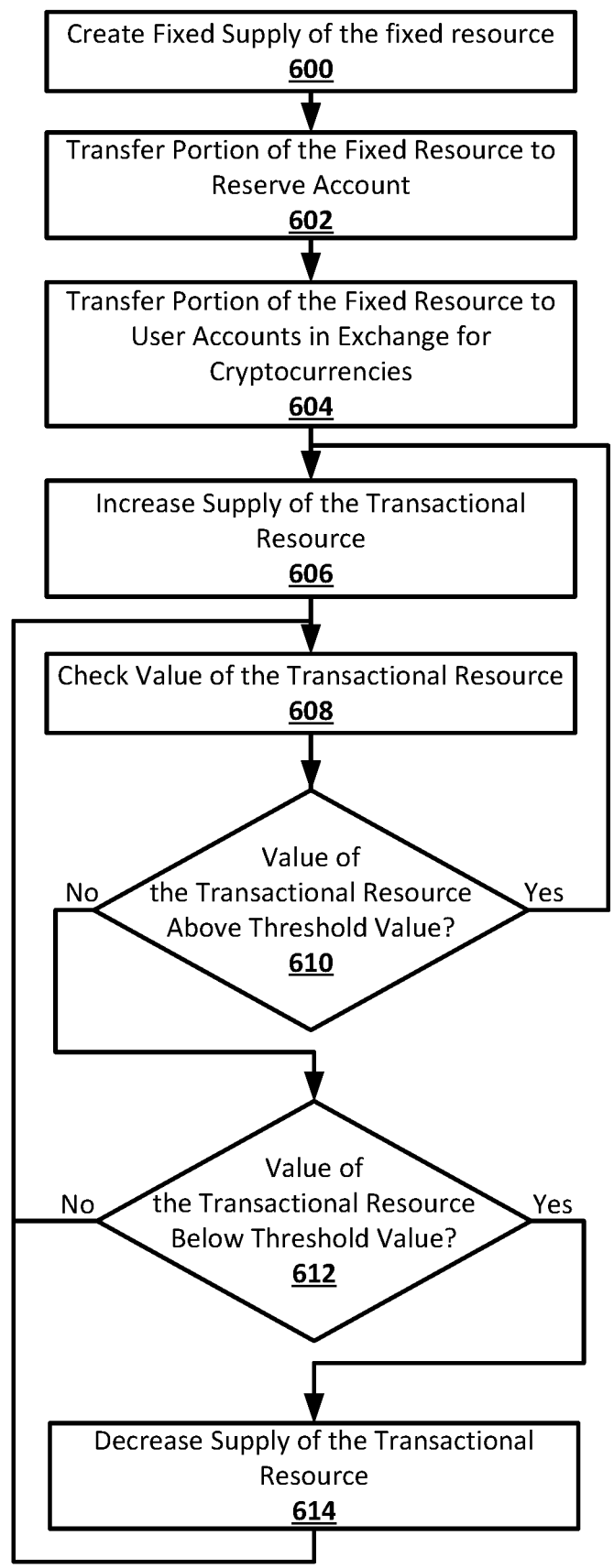
FIG. 6 shows an example procedure suitable for a resource stabilization in a distributed network according to an implementation of the disclosed subject matter.

FIG. 6 shows an example procedure suitable for a resource stabilization in a distributed network according to an implementation of the disclosed subject matter. At 600, a fixed supply of the fixed resource may be created. For example, the protocol that operates the distributed network may create a fixed supply of the fixed resource in the distributed network. The supply may be fixed as part of the protocol, which may be running on the distributed network client 110 on all of the computing devices and systems that are part of the distributed network.

At 602, a portion of the fixed resource may be transferred to a reserve account. For example, the protocol that operates the distributed network may execute a transfer of some of the initially created fixed resource into a reserve account. The reserve account may be an account in the decentralized database of the distributed network that may be controlled by, for example, the protocol that operates the distributed network. The portion of the fixed resource transferred into the reserve account may be, for example, 50% of the fixed resource that is initially distributed from the fixed supply of the fixed resource. Not all of the fixed resource from the fixed supply may be initially distributed, as some of the fixed resource may be distributed later as, for example, a reward for mining a block of the decentralized database. For example, only 40% of the fixed resource may be initially distributed, with 50% of that portion being transferred to the reserve account.

At 604, a portion of the fixed resource may be transferred to user accounts in exchange for cryptocurrencies. For example, the protocol that operates the distributed network may transfer the portion of the initially distributed fixed resource not transferred to the reserve account into user accounts in the decentralized database of the distributed network. The fixed resource may be distributed in exchange for cryptocurrencies which may be transferred to the reserve account. The cryptocurrencies received in exchange for the fixed resource may be held by an entity elected through governance using keys that function on the networks for the received cryptocurrencies, or the received cryptocurrencies may be bridged onto the distributed network and represented on the distributed network as tokens using trustless bridges, with the tokens representing the other cryptocurrencies held natively in the reserve account. The fixed resource may be distributed, for example, through an auction in which computing devices and systems of the distributed network may participate. The auction may be conducted by, for example, the smart contract 125 of the distributed network client 110. The fixed resource may also be distributed through, for example, exchanges at a rate set by the protocol that operates the distributed network.

At 606, the supply of the transactional resource may be increased. For example, the distributed network may initially include no supply of the transactional resource. The supply of the transactional resource may be increased by, for example, creation of an amount of the transactional resource by the protocol that operates the distributed network followed by distribution of this created amount of the transactional resource to user accounts in the decentralized database of the distributed network. The distribution of the transactional resource may be through, for example, an auction conducted by the smart contract 125 of the distributed network client 110. The auction may be open to any computing devices and systems that are part of the distributed network, for example, are running their own copy of the distributed network client 110. Bids may be made using any suitable cryptocurrency, such as, for example, the fixed resource. Amounts of the transactional resource may be transferred to the user accounts associated with the computing devices and systems from which winning bids were submitted during the auction. The cryptocurrency or the fixed resource of the winning bids may be transferred to the reserve account. The supply of the transactional resource may also be increased when, for example, the value of the transactional resource is above the threshold value relative to the specified external resource.

At 608, the value of the transactional resource may be checked. For example, a median finder of the smart contract 125 may determine the current median value of the transactional resource relative to a specified external resource, such as, for example, the US dollar. The median finder may, for example, read a public variable stored in the decentralized database that may include a key for an element of the value list 155, for example, in the form of the doubly linked list 400, that includes the current median value of the transactional resource. The median finder of the smart contract 125 may read the median value from the element of the doubly linked list 400 whose key is stored as a public variable.

At 610, if the value of the transactional resource is above a threshold value, flow may proceed back to 606. Otherwise, flow may proceed to 612. For example, the median value of the transactional resource compared to the specified external resource may be checked against a threshold value. If the median value is above the threshold value, this may indicate an undersupply of the transactional resource, and flow may proceed back to 606, where the supply of the transactional resource may be increased, for example, through creation and auctioning of an amount of the transactional resource by the smart contract 125.

At 612, if the value of the transactional resource is below a threshold value, flow may proceed to 614. Otherwise, flow may proceed back to 608. For example, if the median value of the transactional resource is below the threshold value, this may indicate an oversupply of the transactional resource. Flow may proceed to 614, where the supply of the transactional resource may be decreased. Otherwise, flow may proceed back to 608, where the value of the transactional resource may be checked again, as the value of the transactional resource may be neither above or below the threshold value, indicating that the transactional resource is at the threshold value. The threshold value may be a single value or may be a value range.

At 614, the supply of the transactional resource may be decreased. For example, amounts of the transactional resource may be obtained from the user accounts and destroyed. The amounts of the transactional resource may be obtained by, for example, an auction conducted by the smart contract 125. The auction may be open to any computing devices and systems that are part of the distributed network, for example, are running their own copy of the distributed network client 110 and have control of user accounts that contain some amount of the transactional resource. Bids may be made using the transactional resource. Tokens may be transferred to the user accounts associated with the computing devices and systems from which winning bids were submitted during the auction. The amount of the transactional resource from the winning bids may be destroyed.

Figure 7:
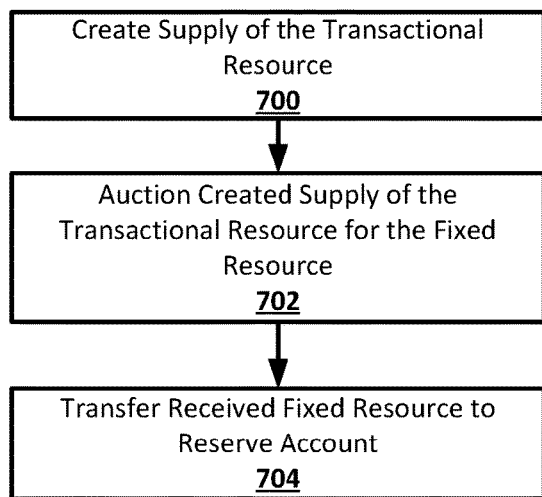
FIG. 7 shows an example procedure suitable for a resource stabilization in a distributed network according to an implementation of the disclosed subject matter.

FIG. 7 shows an example procedure suitable for a resource stabilization in a distributed network according to an implementation of the disclosed subject matter. At 700, a supply of the transactional resource may be created. For example, the median finder of the smart contract 125 may have determined that the median value of the transactional resource is above the threshold value, as at 610, indicating the supply of the transactional resource may need to be increased, as at 606. The smart contract 125 may create a supply of the transactional resource that may be auctioned off, for example, incrementing the amount of the transactional resource held in the reserve account or another account controlled by the protocol that operates the distributed network.

At 702, the created supply of the transactional resource may be auctioned for the fixed resource. For example, the smart contract 125 may conduct an auction of any suitable type in which bids may be placed using the fixed resource for amounts of the transactional resource. The bids may, for example, be inserted into a binary search tree that may be ordered by the exchange rate from the fixed resource to the transactional resource. The auction may include a cap set by the smart contract 125, which may indicate the maximum amount of the transactional resource that may be transferred out to winning bidders of the auction. The winning bidders may be associated with user accounts in the decentralized database. The amount of the transactional resource won by winning bidders may be transferred to their respective user accounts.

At 704, received fixed resource may be transferred to the reserve account. For example, the fixed resource received from the winning bidders of the auction may be transferred to the reserve account in the decentralized database. The median value of the transactional resource may be checked again, as at 608, and another auction may be conducted to further increase the supply of the transactional resource if the median value is determined to still be above the threshold value, as at 610.

Figure 8:
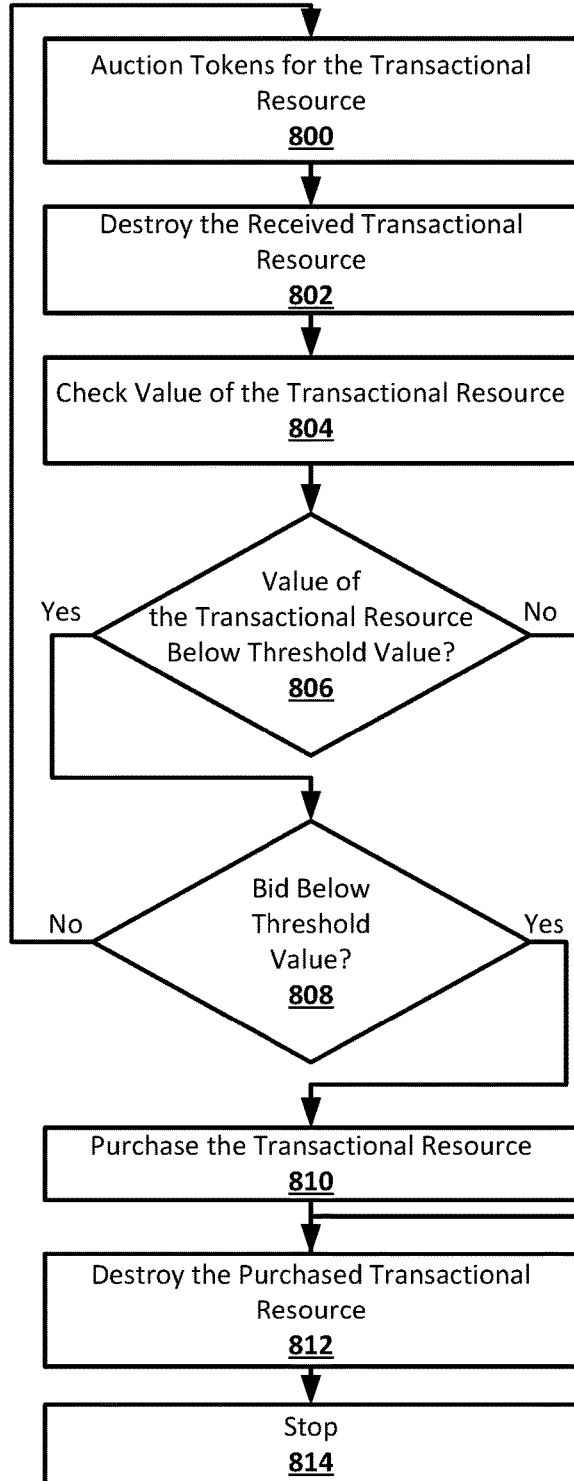
FIG. 8 shows an example procedure suitable for a resource stabilization in a distributed network according to an implementation of the disclosed subject matter.

FIG. 8 shows an example procedure suitable for a resource stabilization in a distributed network according to an implementation of the disclosed subject matter. At 800, tokens may be auctioned for the transactional resource. For example, the median finder of the smart contract 125 may have determined that the median value of the transactional resource is below the threshold value, as at 612, indicating the supply of the transactional resource may need to be decreased, as at 614. The smart contract 125 may conduct an auction of any suitable type in which bids may be placed using the transactional resource for the tokens. The bids may, for example, be inserted into a binary search tree that may be ordered by the exchange rate from the transactional resource to the tokens. The auction may include a cap set by the smart contract 125, which may indicate the maximum amount of the tokens that may be transferred out to winning bidders of the auction. The winning bidders may be associated with user accounts in the decentralized database. The amount of the tokens won by winning bidders may be transferred to their respective user accounts.

At 802, received transactional resource may be destroyed. For example, the transactional resource received from the winning bidders of the auction may be transferred to an address for a non-existent account in the decentralized database, rendering that transactional resource inaccessible and functionally destroying it. The transactional resource may also be destroyed by, for example, the smart contract 125 decrementing the amount of the transactional resource held in the reserve account without transferring the transactional resource to another account. This may decrease the total supply of the transactional resource in the distributed network.

At 804, the median value of the transactional resource may be checked. For example, the median finder of the smart contract 125 may check the median value of the transactional resource, as at 608.

At 806, if the value of the transactional resource is below a threshold value, flow may proceed to 810. Otherwise, flow may proceed to 814 and end. For example, if the median value of the transactional resource is below the threshold value, this may indicate an oversupply of the transactional resource that was not corrected by the auction and destruction of amounts of the transactional resource as at 800 and 802. The supply of the transactional resource may need to be decreased further. Flow may proceed to 808, where the bid exchange rates from the auction may be checked. Otherwise, flow may proceed 814 and end, completing the decreasing of the supply of the transactional resource until another auction is needed.

At 808, if there are bid exchange rates from the auction that are below a threshold value, flow may proceed to 810. Otherwise, flow may proceed back to 800. For example, if bid exchange rates from the auction of the tokens dropped below a threshold value, it may not be useful to conduct another auction to attempt to decrease the supply of the transactional resource further. Flow may proceed to 810, where amounts of the transactional resource may be purchased directly. Otherwise, flow may proceed back to 800, the auction of the tokens for the transactional resource may continue.

At 810, the transactional resource may be purchased. For example, the smart contract 125 may use the fixed resource, and other cryptocurrencies, held in the reserve account in exchanges for the transactional resource from user accounts in the decentralized database. The smart contract 125 may continue making exchanges until enough of the transactional resource has been exchanged for to bring the value of the transactional resource back to the threshold value, or until there is no longer any fixed resource and cryptocurrencies in the reserve account.

At 812, the purchased transactional resource may be destroyed. For example, the smart contract 125 may destroy any amount of the transactional resource exchanged for using the fixed resource and other cryptocurrencies from the reserve account.

At 814, the flow may stop. For example, the supply of the transactional resource may have been decreased enough to bring the value of the transactional resource back up to the threshold value. This may, for example, complete the decrease of the supply of the transactional resource, as at 614, ending 614 so that flow may proceed back to 608.

Figure 9:
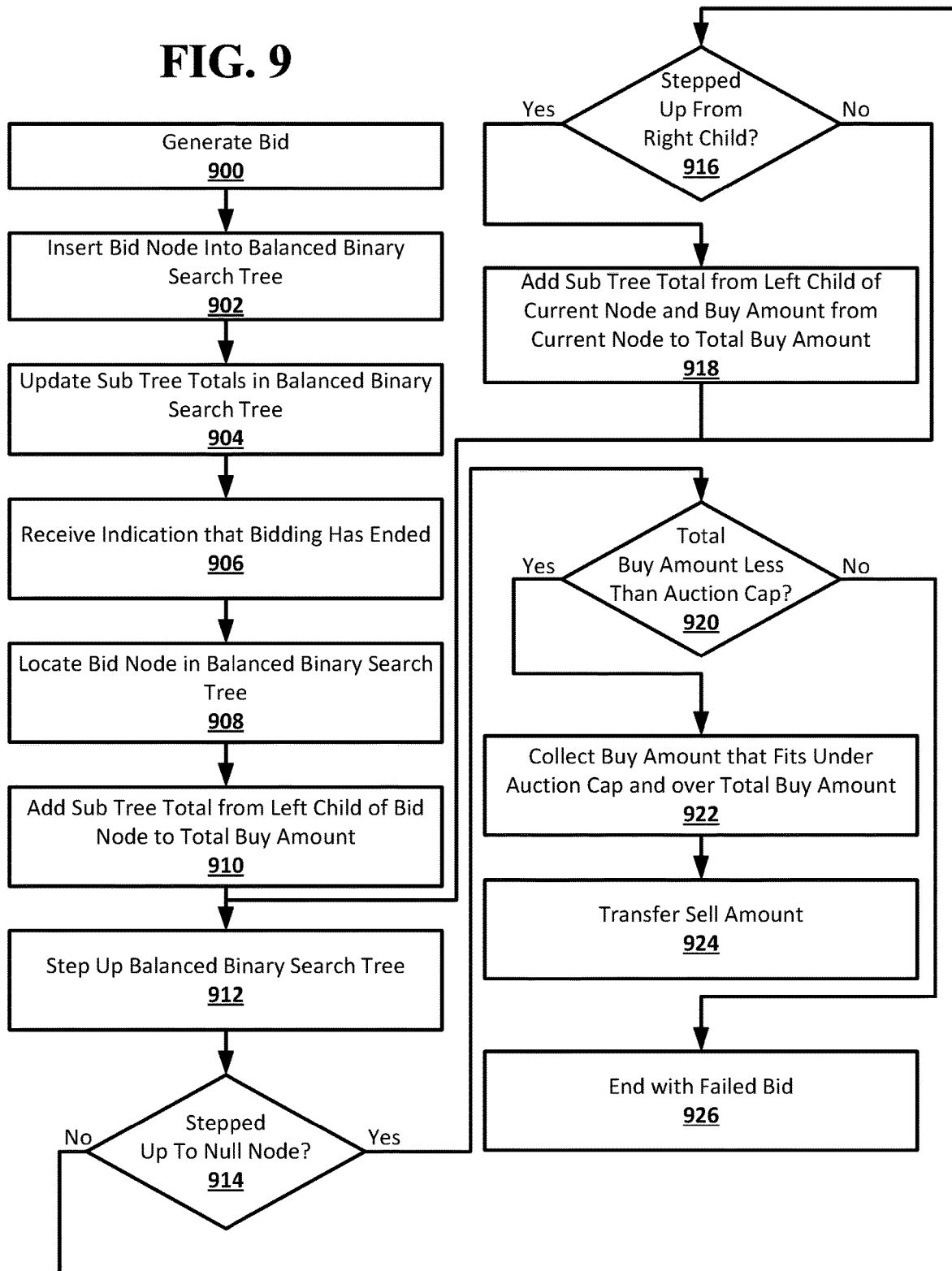
FIG. 9 shows an example procedure suitable for a resource stabilization in a distributed network according to an implementation of the disclosed subject matter.

FIG. 9 shows an example procedure suitable for a resource stabilization in a distributed network according to an implementation of the disclosed subject matter. At 900, a bid may be generated. For example, the smart contract 125 may be conducting an auction, as at 702 or 800, that may be open to the computing devices and systems of the distributed network, and the computing device 210 may participate in the auction. The computing device 210 may generate a bid that may include a buy amount, a sell amount, and an exchange rate based on the buy amount and the sell amount. The bid may also include a bid ID, which may be used to identify the node for the bid in the balanced binary search tree 500.

At 902, the bid may be inserted into a balanced binary search tree. For example, each computing device or system that wants to submit a bid in an auction conducted by the smart contract 125 may perform the computation to submit its own bid into a balanced binary search tree for the auction. The computing device 210 may, for example, perform the necessary computation to insert its generated bid into the balanced binary search tree 500, which may be, for example, a red-black tree. The computing device 210 may locate the appropriate point of insertion for the bid, for example, based on the exchange rate of the bid, in the balanced binary search tree 500, and insert a node for the bid, performing any necessary operations on other nodes to maintain the balance of the balanced binary search tree 500. The insertion of the bid into the balanced binary search tree 500 may be performed by, for example, the distributed network client 110 running on the computing device or system that submitted the bid.

At 904, sub tree totals in the balanced binary search tree may be updated. For example, after every insertion of a node into a balanced binary search tree for an auction, the computing device or system responsible for the auction may update the sub tree totals in any nodes of the balanced binary search tree that may have new or different child nodes after the insertion. For example, the computing device 210 may insert the node 514 into the balanced binary search tree 500 as a child node of the node 511. The computing device 210 may then update the sub tree totals for both the node 511 and the node 510 to reflect the buy amount from the node 514. The updating of sub tree totals of nodes in the balanced binary search tree 500 after insertion of a bid may be performed by, for example, the distributed network client 110 of the computing device or system that submitted the bid.

At 906, an indication may be received that bidding has ended. For example, the smart contract 125 may close bidding in an auction after any suitable amount of time or based on the occurrence of any suitable event. The smart contract 125 may indicate to the various computing devices and systems of the distributed network that submitted bids, such as the computing device 210, that bidding has ended.

At 908, a bid node may be located in the balanced binary search tree. For example, any computing device or system that inserted a node for a bid it submitted into the balanced binary search tree for the auction may locate that bid node in the balanced binary search tree once bidding has ended. The bid node may be located in any suitable manner, including, for example, through use of the bid ID and exchange rate. For example, the computing device 210 may locate its bid by performing a search of the balanced binary search rate 500 for the exchange rate of 1.18, which may be the exchange rate of the bid submitted by the computing device 210. The computing device 210 may then locate the node with the exchange rate 1.18 that also has the bid ID 7. This may be the bid node for the bid submitted by the computing device 210. The computing device 210 may also locate the bid node for its bid using, for example, a pointer to the bid node created when the node 514 was inserted in the balanced binary search tree 500. The pointer may still point to the node 514, as pointers may be maintained in the balanced binary search tree 500 even as computing devices and systems insert bid nodes for their bids change which nodes points to which other nodes to maintain the sorting and balance of the balanced binary search tree 500. The locating of the bid may be performed by, for example, the distributed network client 110 of the computing device or system that submitted the bid.

At 910, the sub tree total from the left child of the bid node may be added to a total buy amount. A computing device or system that submitted a bid during the auction may determine whether its bid fits under an auction cap set by the smart contract 125 by adding up the total buy amounts for all bids that have better exchange rates. For example, the computing device 210 may start determining the total buy amount for all bids that have better exchange rates than 1.18 by adding the sub tree total for the left child of the node 514 to the total buy amount. The node 514 may have no left child, so the total buy amount may start at 0. The node 511 may have the node 513 as its left child, so a determination of the total buy amount at better exchange rates than 1.15 may start at 500, which may be the sub tree total for the node 513. The sub tree total from the left child may be used when the balanced binary search tree for the auction is sorted so that the left child of a node always has a higher exchange rate than the right child. If the balanced binary search tree is sorted so that the right child always has a higher exchange rate than the right child, the sub tree total of the right child may be used instead. The adding of the sub tree total of the left child may be performed by, for example, the distributed network client 110 of the computing device or system that submitted the bid.

At 912, a step up may be taken in the balanced binary search tree. The computing devices or systems that are determining the total buy amount that is at better exchange rates than their bid may step up from the node they are currently on to that node's parent. For example, after the computing device 210 starts determining the total buy amount, it may step up the balanced binary search tree 500 from the node 514 to its parent, the node 511. The step up may be performed by, for example, the distributed network client 110 of the computing device or system that submitted the bid.

At 914, if the node stepped up to is null, flow may proceed to 920, where the determined total buy amount at better exchange rates may be compared to the auction cap. Otherwise, flow may proceed to 916, where the determination of the total buy amount at better exchange rates may continue. Stepping up from the parent node of a balanced binary search tree may result in stepping up to a null node. For example, the node 510 may be the parent node of the balanced binary search tree 500. Stepping up from the node 510 may result in stepping up to a null node. The computing device 210 may, for example, step up from the node 514 to the node 511, from the node 511 to the node 510, and the from the node 510 to a null node, indicating that the computing device 210 has completed the determination of the total buy amount at better exchange rates than 1.18.

At 916, if the node stepped up from was a right child, flow may proceed to 918, where additions may be made to the total buy amount. Otherwise, flow may proceed 912, where the current node may be stepped up from. For example, the node 514 may be the right child of its parent node, the node 511. The computing device 210 may make additions to the total buy amount after stepping up from the node 514 to the node 511. The node 511 may be the left child of the node 510. After stepping up from the node 511 to the node 510, the computing device 210 may not make additions to the total buy amount and may step up from the node 510. If the balanced binary search is sorted such that the right child always has greater exchange rates than the left child, additions may be made to the total buy amount when stepping up from the left child, and no such additions may be made when stepping up from the right child.

At 918, the sub tree total from the left child of the current node and buy amount from the current node may be added to the total buy amount at better exchange rates. After stepping up to a node from the right child of the node, a computing device or system may add the sub tree total from the left child of the node and buy amount from the node to the total buy amount at better exchange rates. For example, the computing device 210, after stepping up from the node 514 to the node 511, may add the sub tree total from the left child of the node 511, the node 513, and the buy amount from the node 511 to the total buy amount, which may then be 600. If the balanced binary search is sorted such that the right child always has greater exchange rates than the left child, the sub tree total from the right child of the node may be added to the total buy amount instead. The adding of the sub tree total from the left child of the current node and buy amount of the current node may be performed by, for example, the distributed network client 110 of the computing device or system that submitted the bid.

At 920, if the total buy amount at better exchange rates is less than the auction cap, flow may proceed to 922, where the submitter of the bid may collect the portion of their buy amount that fits under the auction cap. Otherwise, flow may proceed to 926, where the auction may end for the bidder with a failed bid. For example, the computing device 210 may compare the determined total buy amount at better exchange rates, 600, to the auction cap set by the smart contract, which may be 800. As the total buy amount fits under the auction cap, the computing device 210 may proceed to collect the buy amount that fits under the auction cap and over the total buy amount at better exchange rates. If the total buy amount at better exchange rates had met or exceed the auction cap, for example, if the auction cap had been 500, then the bid submitted by the computing device 210 may have failed, as the entire auction cap will be used up filling bids at better exchange rates from other computing systems and devices.

At 922, the buy amount that fits under the auction cap and over the total buy amount may be collected. For example, the computing device 210 may have determined a total buy amount at better exchange rates of 600 for an auction with a cap of 800. This may allow the buy amount of 100 in the bid submitted by the computing device 210 to fit under the auction cap and over the total buy amount at better exchange rates. The computing device 210 may collect its buy amount of 100 of whatever was being auctioned, for example, the transactional resource or tokens. A computing device or system may only collect the portion of its but amount that fits both under the auction cap and over the total buy amount at better exchange rates. For example, if the auction cap were 650, the computing device 210 may only be able to collect 50 of whatever was being auctioned instead of the full 100 of the buy amount of the bid. The computing device 210 may collect on its buy amount by, for example, having the buy amount, which may be the transactional resource or tokens, transferred to a user account associated with the computing device 210 in the decentralized database of the distributed network. The smart contract 125 may make the transfer from, for example, the reserve account in the decentralized database of the distributed network.

At 924, the sell amount may be transferred. For example, the computing device 210 may transfer the sell amount, which may be, for example, the transactional resource, the fixed resource, or some other cryptocurrency, from its bid to the reserve account. If the sell amount is some other cryptocurrency, a transfer of the other cryptocurrency may occur using the database for that cryptocurrency to an account that is associated with the reserve account of the decentralized database of the distributed network. The entire sell amount may be transferred only if the entire buy amount from the bid fits under the auction cap and over the total buy amount at better exchange rates. If the amount collected at 922 is less than the buy amount from the bid, the sell amount may be the amount collected multiplied by the exchange rate.

Each computing device and system that submits a bid in an auction conducted by the smart contract 125 may be responsible for both inserting a node for its bid into the balanced binary search tree for the auction, and for determining the total buy amount at better exchange rates when the bidding has ended. This may distribute the computation required to conduct the auction across all of the computing devices and systems that participate in the auction, rather than requiring a single computing device or system perform all of the computation for the auction.

Figure 10:
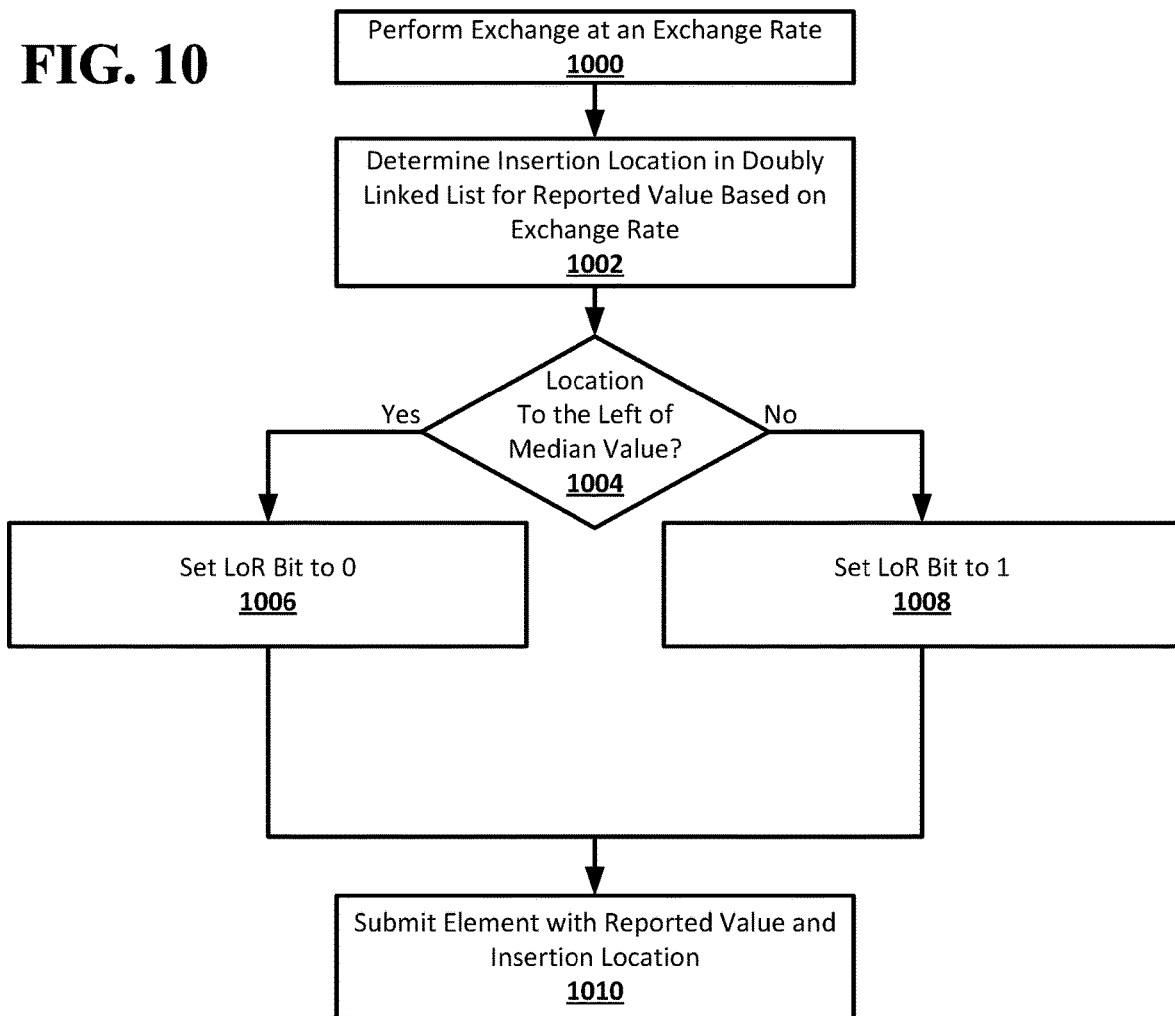
FIG. 10 shows an example procedure suitable for a resource stabilization in a distributed network according to an implementation of the disclosed subject matter.

FIG. 10 shows an example procedure suitable for a resource stabilization in a distributed network according to an implementation of the disclosed subject matter. At 1000, an exchange may be performed at an exchange rate. For example, any of the computing devices or systems of the distributed network, such as the computing device 210, may exchange some amount of the transactional resource for the specified external resource, or for some other resource which may be valued in terms of the specified external resource. The exchange may involve a transfer of the transactional resource from one user account to another user account in the decentralized database of the distributed network, and a transfer of the resource received in exchange for the transactional resource outside of the distributed network. The exchange may be performed at a specified exchange rate between the transactional resource and the specified external resource.

At 1002, an insertion location in a doubly linked list may be determined for a reported value based on the exchange rate. The computing device or system that performed the exchange may be a whitelisted, or oracle, computing device or system for the distributed network, and may report the value of the transactional resource from its exchange to the distributed network. For example, the computing device 210 may perform an exchange with an exchange rate of 1.03, which may be the value of the transactional resource relative to the specified external resource in the exchange. The computing device 210 may search the doubly linked list 400 to determine where the element 416, including the reported value of 1.03, should be inserted so that the elements of the doubly linked list 400 remains sorted by value. The computing device 210 may determine that the element 416 should be inserted in between the element 414 and the element 415. The determination of an insertion location may be performed by, for example, the distributed network client 110 of the computing device or system that performed the exchange.

At 1004, if the insertion location for the is to the left of the element with the median value, flow may proceed to 1006. Otherwise, flow may proceed to 1014. Whether the insertion location is to the left of the element with the median value may be determined by, for example, examining the value of the element with the median value, which may be accessed through a key stored as a public variable accessible to, for example, the distributed network client 110. If the value of the element being inserted is greater than the median value, and the doubly linked list 400 is sorted from lowest value on the left to highest value on the right, the element may have an insertion location to the right of the element with the median value. Otherwise, if the value of the element is lower than the median value, the element may have an insertion location to the left of the element with the median value. If the value of the element is the same as the median value, the elements to the left and right of the insertion location may be checked to determine which one has the median value.

At 1006, the LoR bit of the element may be set to 0. For example, the computing device or system that determined the insertion location for the element in the doubly linked list 400 is to the left of the element with the median value may set the LoR bit of the inserted to 0.

At 1008, the LoR bit of the inserted element may be set to 1. For example, the computing device or system that determined the insertion location for the element in the doubly linked list 400 is to the right of the element with the median value may set the LoR bit of the inserted to 1.

At 1010, the element may be submitted with the insertion location and reported value. For example, the computing device or system that determined the insertion location for the element may submit the element to the smart contract 125. The element may include the reported value, based on the exchange rate, the key of the computing device or system submitting the element, and the LoR bit set to 1 or 0. The computing device or system may also submit the keys of the elements to the left and the right of the determined insertion location for the element in the doubly linked list 400.

Figure 11:
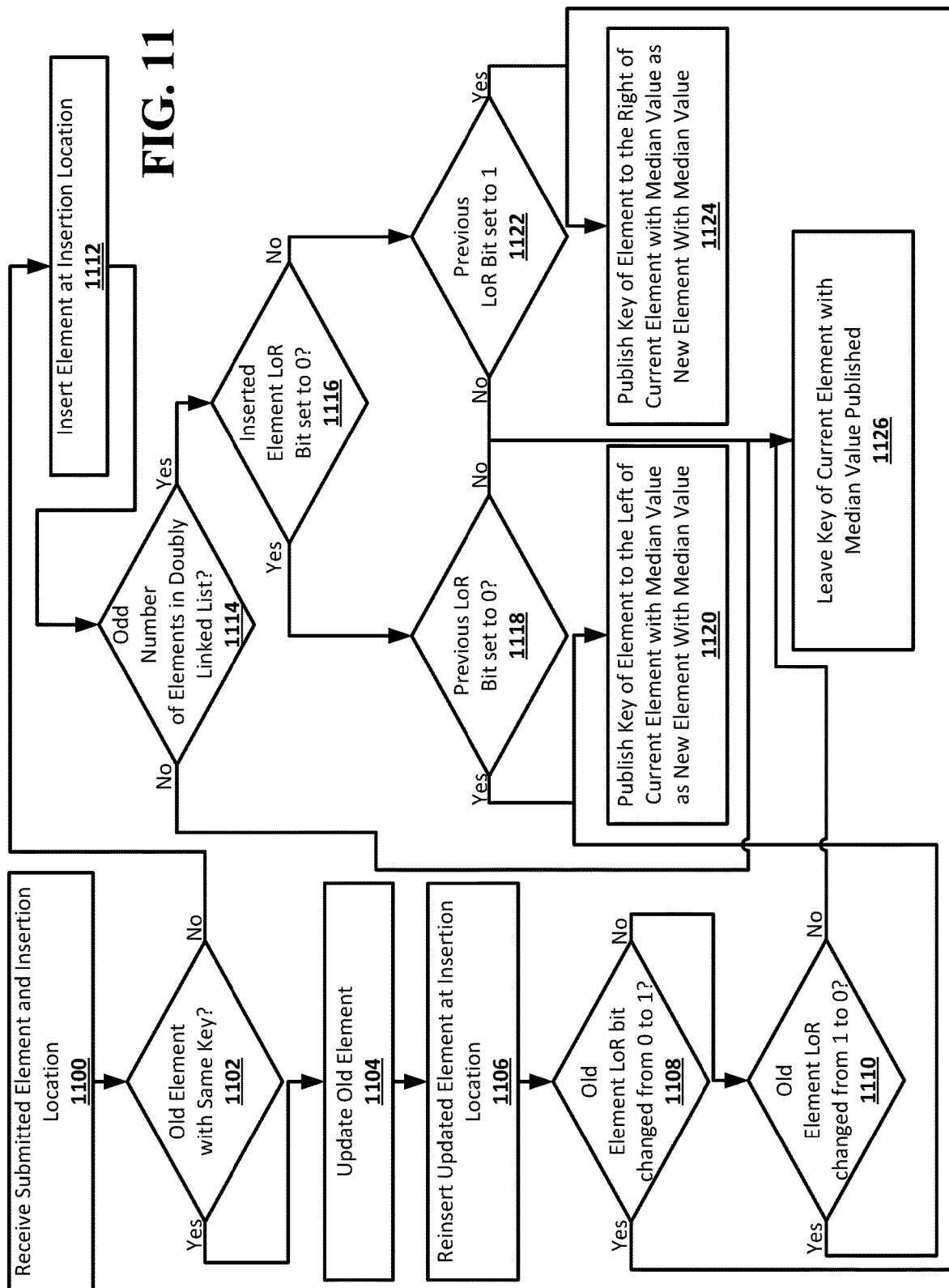
FIG. 11 shows an example procedure suitable for a resource stabilization in a distributed network according to an implementation of the disclosed subject matter.

FIG. 11 shows an example procedure suitable for a resource stabilization in a distributed network according to an implementation of the disclosed subject matter. At 1100, an element and insertion location may be received. The smart contract 125 may receive an element from a whitelisted computing device or system of the distributed network. For example, from the distributed network client 110 running on the computing device 210 may submit the element 416 to the smart contract 125 running in the distributed network client 110. The smart contract 125 may also receive the insertion location in the doubly linked list 400 for the element. For example, the computing device 210 may submit, along with the element 416, the keys for the elements 414 and 415, which the element 416 will be inserted between.

At 1102, if the key of the received element is the same as the key of an old element that is already part of the doubly linked list, flow may proceed to 1104, where the old element may be updated. Otherwise, flow may proceed to 1112, where the element may be inserted as a new element. For example, a computing device or system that has already submitted an element with a reported value may submit a subsequent element with a new reported value. The previously submitted element and the newly submitted element may have the same key, identifying the computing device or system that submitted both elements. The previously submitted element may be updated with the new reported value.

At 1104, an old element may be updated. For example, the element in the doubly linked list 400 the has the same key as the received element may be modified to include the new reported value, replacing the reported value in the old element. Any timestamps in the element may also be updated to reflect the recency of the new reported value. The LoR bit of the old element may also be updated. For example, if the LoR bit is 1, but the new reported value is lower than the value of the current median element, the LoR bit may be set to 0, as the updated element may now belong on the left of the element with the median value.

At 1106, an updated element may be reinserted at the insertion location. After having its value updated, the old element may no longer be in the correct location in the doubly linked list 400. The updated element may be removed from the doubly linked list 400 and reinserted at the received insertion location. For example, the addresses for the right and left linked elements of the updated element may be changed to point to the elements that the keys of the insertion location indicate should be to the left and right of the element. This may maintain the sorting of the doubly linked list 400 after the value of the old element was changed to the new reported value.

At 1108, if the LoR bit of the old element was changed from 0 to 1, flow may proceed to 1120, where which element has the median value may be updated. Otherwise, flow may proceed to 1110.

At 1110, if the LoR bit of the old element was changed from 1 to 0, flow may proceed to 1120, where which element has the median value may be updated. Otherwise, flow may proceed to 1126, where which element has the median value may remain unchanged, as the updated element may have been reinserted on the same side of the element with the median value that the old element was on.

At 1112, the element may be inserted into the doubly linked list. The smart contract 125 may first ensure that the insertion location is correct by comparing the reported value in the element to the values in the elements whose keys were submitted as the insertion location to ensure that the elements are still next to each other in the doubly linked list 400 and that the value in the element is between the values in the elements that it will be inserted between. If the elements that the received element will be inserted between are no longer next to each other, the element may be discarded. If the insertion location is incorrect, the smart contract 125 may correct the insertion location, or may discard the element. If the insertion location is correct, the smart contract 125 may insert the element at the insertion location. For example, the smart contract 125 may insert the element 416 into the doubly linked list 400 in between the element 414 and the element 415, adjusting the left and right pointers of the elements as necessary to maintain the double linkages and sorting of the doubly linked list 400. If the value of the inserted element is the same as the value of an element in the doubly linked list 400, the inserted element may be inserted on either side of that element.

At 1114, if there are an odd number of elements in the doubly linked list, flow may proceed to 1106. Otherwise flow may proceed 1116, where which element has the median value may remain unchanged.

At 1116, if the LoR bit of the inserted element is 0, flow may proceed to 1108, otherwise flow may proceed to 1112, as the LoR bit of the inserted element may be 1.

At 1118, if the LoR bit of the element inserted prior to the just inserted element was also set to 0, flow may proceed to 1110, where which element has the median value may be changed. Otherwise, flow may proceed to 1116, where which element has the median value may remain unchanged. For example, if the doubly linked list 400 includes an odd number of elements after the insertion of the just inserted element, and both the just inserted element and the element inserted just prior were inserted to the left of the element with the median value, then which element has the median value may need to be changed.

At 1120, the key of the element to the left of the current element with the median value may be published as the new element with median value. If two elements in a row are inserted on the left side of the current element with the median value, and there an odd number of elements in the doubly linked list 400, the element linked to the left of the current element with the median value may become the new element with the median value. The key of this element may be published, for example, made a publicly available variable accessible by all of the distributed network clients on all of the computing devices and systems in the distributed network. The smart contract 125 may access this key to determine the current median value of the transactional resource, for example, as at 608 and 804.

At 1122, if the LoR bit of the element inserted prior to the just inserted element was also set to 1, flow may proceed to 1114, where which element has the median value may be changed. Otherwise, flow may proceed to 1116, where which element has the median value may remain unchanged. For example, if the doubly linked list 400 includes an odd number of elements after the insertion of the just inserted element, and both the just inserted element and the element inserted just prior were inserted to the right of the element with the median value, then which element has the median value may need to be changed.

At 1124, the key of the element to the right of the current element with the median value may be published as the new element with median value. If two elements in a row are inserted on the right side of the current element with the median value, and there an odd number of elements in the doubly linked list 400, the element linked to the right of the current element with the median value may become the new element with the median value. The key of this element may be published, for example, made a publicly available variable accessible by all of the distributed network clients on all of the computing devices and systems in the distributed network. The smart contract 125 may access this key to determine the current median value of the transactional resource, for example, as at 608 and 804.

At 1126, the key of the current element the median value may be left published. For example, if the doubly linked list 400 has an even number of elements after the insertion of the just inserted element, or the last two inserted elements were inserted on opposite sides of the element with the median value, which element has the median value may not need to be changed. The previously published key of the current element with the median value may remain published, for example, the publicly accessible variable may not be changed, so that the smart contract 125 may retrieve the key of the current element with the median value when checking the median value of the transactional resource.

Figure 12:
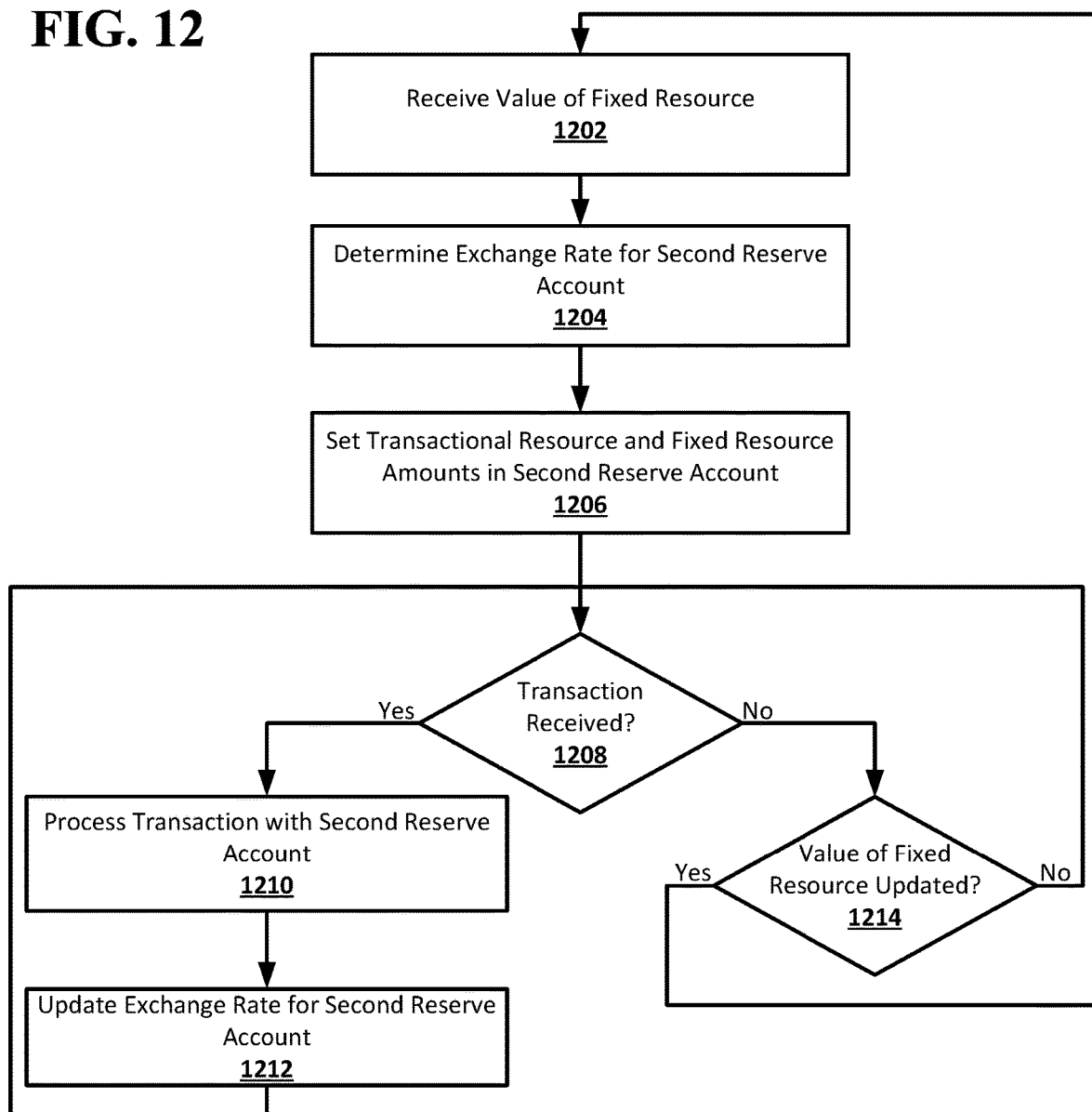
FIG. 12 shows an example procedure suitable for a resource stabilization in a distributed network according to an implementation of the disclosed subject matter.

FIG. 12 shows an example procedure suitable for a resource stabilization in a distributed network according to an implementation of the disclosed subject matter. At 1200, a value of the fixed resource may be received. The value may be, for example, the value of the fixed resource relative to a specified external resource, such as a fiat currency. The value may be received from, for example, an oracle of the distributed network, which may include computing devices and systems that have been whitelisted in the distributed network.

At 1204, an exchange rate may be determined for a second reserve account. For example, the exchange rate for a second reserve account for transactions between the fixed resource and the transactional resource may be set to the value of the of the fixed resource relative to the specified external resource. For example, if the value of the fixed resource relative to the specified external resource is 5:1, the exchange rate for the reserve account by set to 5:1 between the fixed resource and the transactional resource. The second reserve account may be an account in the decentralized database that is operated by the protocol that operates the distributed network.

At 1206, transactional resource and fixed resource amounts in the second reserve account may be set. For example, the protocol that operates the distributed network may transfer some percentage of the fixed resource from the reserve account to the second reserve account, and may create an amount of the transactional resource and add it to the second reserve account. The amount of the fixed resource and transactional resource in the second reserve account may be set so that the ratio of the amount of the fixed resource to the amount of the transactional resource is the same as the exchange rate between the fixed resource and the transactional resource. For example, if the exchange rate is 5:1, the ratio of the fixed resource to the transactional resource may be 5:1.

At 1208, if a transaction is received, flow may proceed to 1210. Otherwise, flow may proceed to 1214. Transactions with the second reserve account may be received from user accounts in the decentralized database. The transactions may be, for example, a user account exchanging an amount of the fixed resource from their account on the decentralized database for an amount of the transactional resource from the second reserve account, or may be the user account exchanging an amount of the transactional resource from their account on the decentralized database for an amount of the fixed resource from the second reserve account.

At 1210, the transaction with the second reserve account may be processed. For example, a transaction may have been received from a user account on the decentralized database. The transaction may, for example, exchange an amount of the transactional resource from the second reserve account for an amount of the fixed resource from the user account that submitted the transaction. The transaction may be processed by transferring the amount of the fixed resource from the user account to the second reserve account and transferring an amount of the fixed resource from the second reserve account to the user account according to the exchange rate for the second reserve account. For example, if the exchange rate for the second reserve account is 5:1, and the user account that submitted the transaction transfers five of the fixed resource to the second reserve account, one of the transactional resource may be transferred out of the second reserve account to the user account that submitted the transaction.

At 1212, the exchange rate for the second reserve account may be updated. The exchange rate may be updated based on the ratio of the fixed resource to the transactional resource that exists in the second reserve account after completion of the transaction. For example, if a transaction results in the second reserve account going from having 50 of the fixed resource and 10 of the transactional resource to 55 of the fixed resource and 9 of the transactional resource, the exchange rate may be updated from 5:1 to 6.11:1. The exchange rate of the second reserve account may always reflect the ratio of the amount of the fixed resource to the amount of the transactional resource in the reserve account.

At 1214, if the value of the fixed resource has been updated, flow may proceed back to 1202. Otherwise, flow may proceed back to 1208. The value of the fixed resource to the specified external resource may be updated, for example, by the oracle, at any suitable times and intervals. When the value of the fixed resource to the specified external resource is updated, flow may proceed back to 1202, where an updated value may be received, after which the exchange rate may be set for the second reserve account and the amounts of the fixed resource and transactional resource may be updated to reflect the exchange rate before more transactions are received. When the value of the fixed resource to the specified external resource has not been updated, more transactions may be received using the current exchange rate for the reserve account.

Figure 13:
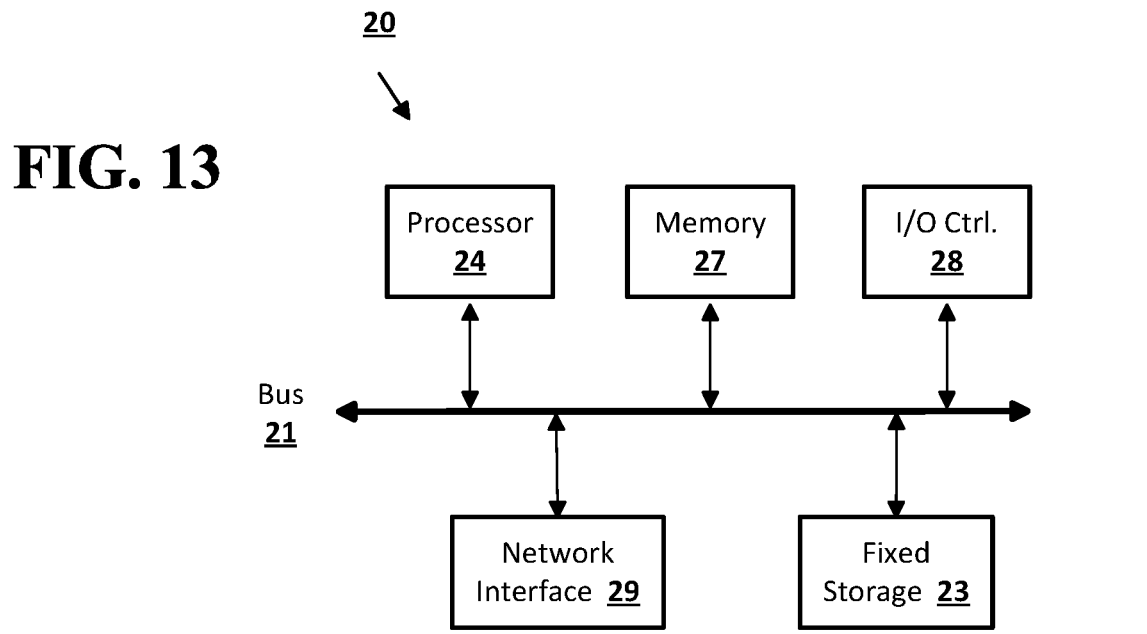
FIG. 13 shows a computer according to an embodiment of the disclosed subject matter.

Embodiments of the presently disclosed subject matter may be implemented in and used with a variety of component and network architectures. FIG. 13 is an example computer system 20 suitable for implementing embodiments of the presently disclosed subject matter. The computer 20 includes a bus 21 which interconnects major components of the computer 20, such as one or more processors 24, memory 27 such as RAM, ROM, flash RAM, or the like, an input/output controller 28, and fixed storage 23 such as a hard drive, flash storage, SAN device, or the like. It will be understood that other components may or may not be included, such as a user display such as a display screen via a display adapter, user input interfaces such as controllers and associated user input devices such as a keyboard, mouse, touchscreen, or the like, and other components known in the art to use in or in conjunction with general-purpose computing systems.

The bus 21 allows data communication between the central processor 24 and the memory 27. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as the fixed storage 23 and/or the memory 27, an optical drive, external storage mechanism, or the like.

Each component shown may be integral with the computer 20 or may be separate and accessed through other interfaces. Other interfaces, such as a network interface 29, may provide a connection to remote systems and devices via a telephone link, wired or wireless local- or wide-area network connection, proprietary network connections, or the like. For example, the network interface 29 may allow the computer to communicate with other computers via one or more local, wide-area, or other networks, as shown in FIG. 14.

Many other devices or components (not shown) may be connected in a similar manner, such as document scanners, digital cameras, auxiliary, supplemental, or backup systems, or the like. Conversely, all of the components shown in FIG. 13 need not be present to practice the present disclosure. The components can be interconnected in different ways from that shown. The operation of a computer such as that shown in FIG. 13 is readily known in the art and is not discussed in detail in this application. Code to implement the present disclosure can be stored in computer-readable storage media such as one or more of the memory 27, fixed storage 23, remote storage locations, or any other storage mechanism known in the art.

Figure 14:
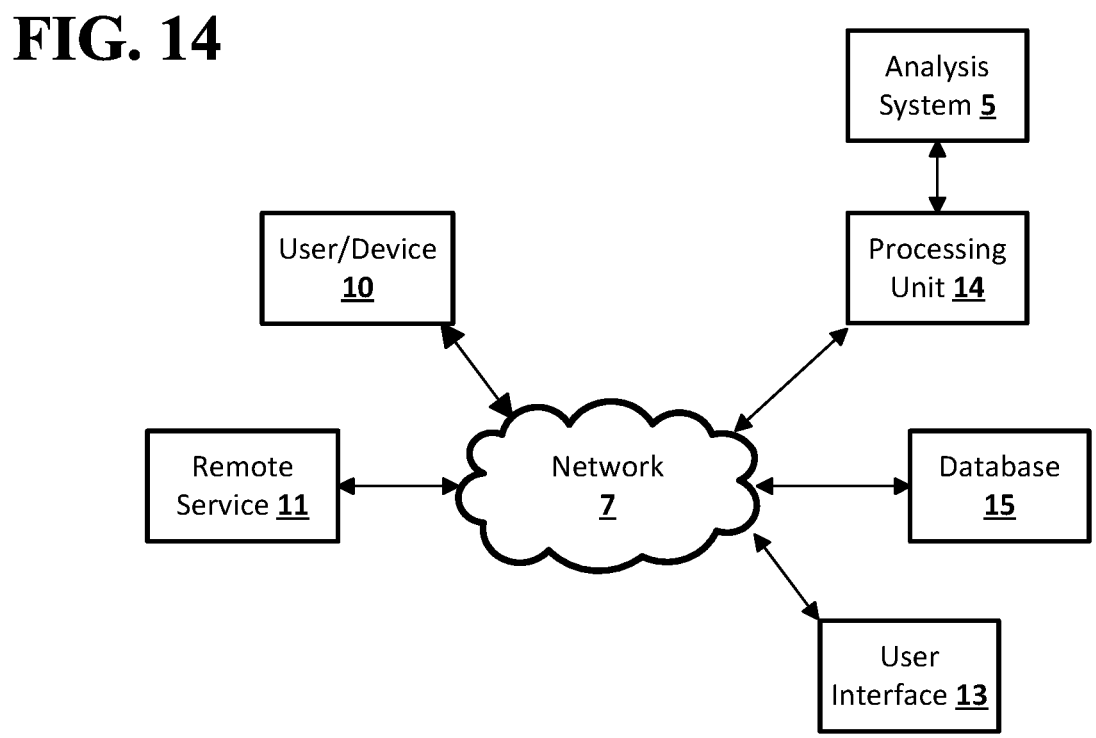
FIG. 14 shows a network configuration according to an embodiment of the disclosed subject matter.

FIG. 14 shows an example arrangement according to an embodiment of the disclosed subject matter. One or more clients 10, 11, such as local computers, smart phones, tablet computing devices, remote services, and the like may connect to other devices via one or more networks 7. The network may be a local network, wide-area network, the Internet, or any other suitable communication network or networks, and may be implemented on any suitable platform including wired and/or wireless networks. The clients 10, 11 may communicate with one or more computer systems, such as processing units 14, databases 15, and user interface systems 13. In some cases, clients 10, 11 may communicate with a user interface system 13, which may provide access to one or more other systems such as a database 15, a processing unit 14, or the like. For example, the user interface 13 may be a user-accessible web page that provides data from one or more other computer systems. The user interface 13 may provide different interfaces to different clients, such as where a human-readable web page is provided to web browser clients 10, and a computer-readable API or other interface is provided to remote service clients 11. The user interface 13, database 15, and processing units 14 may be part of an integral system, or may include multiple computer systems communicating via a private network, the Internet, or any other suitable network. Processing units 14 may be, for example, part of a distributed system such as a cloud-based computing system, search engine, content delivery system, or the like, which may also include or communicate with a database 15 and/or user interface 13. In some arrangements, an analysis system 5 may provide back-end processing, such as where stored or acquired data is pre-processed by the analysis system 5 before delivery to the processing unit 14, database 15, and/or user interface 13. For example, a machine learning system 5 may provide various prediction models, data analysis, or the like to one or more other systems 13, 14, 15.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A computer-implemented method performed on a data processing apparatus comprising:
   checking, by a computing device in a distributed network, the median value of a transactional resource in relation to a specified external resource;
   comparing, by the computing device in the distributed network, the median value of the transactional resource to a threshold value for the transactional resource to determine whether the median value of the transactional resource is above the threshold value or below the threshold value; and
   increasing the supply of the transactional resource in the distributed network in response to determining that the transactional resource is above the threshold value or decreasing the supply of the transactional resource in the distributed network in response to determining that the transactional resource is below the threshold value,
   wherein increasing the supply of the transactional resource in the distributed network further comprises:
   generating, by the computing device in the distributed network, an amount of the transactional resource; and
   conducting, by the computing device in the distributed network, an auction of the generated amount of the transactional resource, wherein the participants in the auction are one or more other computing devices in the distributed network, wherein the auction comprises an auction cap based on the generated amount of the transactional resource, and
   wherein each one of the one or more other computing devices in the distributed network that are participants in the auction participates by:
   submitting, by the one of the one or more other computing devices in the distributed network, a bid comprising a sell amount and a buy amount, wherein the ratio of the sell amount to the buy amount comprises an exchange rate for the bid;
   inserting, by the one of the one or more other computing devices in the distributed network, a node for the bid into a balanced binary search tree for the auction while maintaining a sort order of the balanced binary search tree;
   updating sub tree totals for each node of the balanced binary search tree whose child nodes are changed by the inserting of the node for the bid, wherein the sub tree total comprises the sum of all buy amounts for all of the nodes in a nodes sub tree which includes the node;
   determining, by the one of the one or more other computing devices in the distributed network, a total buy amount for all bids with nodes in the balanced binary search tree at better exchange rates than the exchange rate of the bid submitted by the one of the one or more other computing devices in the distributed network; and
   determining, by the one of the one or more other computing devices in the distributed network, if the buy amount from the bid submitted by the one of the one or more other computing devices in the distributed network fits under the auction cap and over the total buy amount for all bids with nodes in the balanced binary search tree at better exchange rates.

2. The method of claim 1, wherein determining, by the one of the one or more other computing devices in the distributed network, if the buy amount from the bid submitted by the one of the one or more other computing devices in the distributed network fits under the auction cap and over the total buy amount for all bids with nodes in the balanced binary search tree at better exchange rates further comprises:
   locating, by the one of the one or more other computing devices in the distributed network, the node for the bid submitted by the one of the one or more other computing devices in the distributed network in the balanced binary search tree;
   starting the total buy amount for all bids with nodes in the balanced binary search tree at better exchange rates at the sub tree total of the left child node of the node for the bid; and
   until a null node is stepped up to, stepping up from a current node, which starts as the node for the bid, and, when stepping up from a right child node, adding to the total buy amount for all bids with nodes in the balanced binary search tree at better exchange rates the buy amount from the node stepped up to and the sub tree total from the left child node of the node stepped up to.

3. The method of claim 1, further comprising:
   receiving, in a reserve account in a decentralized database of the distributed network, amounts of fixed resource from user accounts associated with computing devices in the distributed network that submitted bids in the auction that fit under the auction cap and over bids at better exchange rates; and
   transferring, to the user accounts associated with the computing devices in the distributed network that submitted bids in the auction that fit under the auction cap and over bids at better exchange rate, amounts of the transactional resource.

4. The method of claim 1, wherein decreasing the supply of the transactional resource in the distributed network further comprises:
   conducting, by the computing device in the distributed network, an auction of an amount of tokens, wherein the participants in the auction are one or more other computing devices in the distributed network, wherein the auction comprises an auction cap based on the amount of the tokens being auctioned.

5. The method of claim 4, further comprising:
   receiving, in a reserve account in a decentralized database of the distributed network, amounts of the transactional resource from user accounts associated with computing devices in the distributed network that submitted bids in the auction that fit under the auction cap and over bids at better exchange rates;
   transferring, to the user accounts associated with the computing devices in the distributed network that submitted bids in the auction that fit under the auction cap and over bids at better exchange rate, amounts of the tokens; and destroying the received amounts of the transactional resource.

6. The method of claim 1, wherein checking, by the computing device in the distributed network, the median value of a transactional resource in relation to a specified external resource further comprises:

retrieving a value of a public variable, wherein the value comprises a key of an element in a doubly linked list;

locating the element of the doubly linked list using the key; and reading the median value of the transactional resource from the element of the doubly linked list.

7. The method of claim 6, wherein the doubly linked list is maintained by:

receiving, from a computing device of the distributed network that has been whitelisted, an element comprising a key of the element, a reported value of the transactional resource from an exchange, and an insertion location comprising a key of an element of the doubly linked list to be linked to the right of the element and a key of an element of the doubly linked list to be linked to the left of the element, and an LoR bit indicating whether the insertion location is to the left or right of an element in the doubly linked list that has the median value; and determining if an element already in the doubly linked list comprises the same key as the key of the element.

8. The method of claim 7, further comprising, when an element already in the doubly linked list comprises the same key as the key of the element:

updating the element already in the doubly linked list with the reported value;

changing the LoR bit of the element already in the doubly linked list if the insertion location is on the opposite side of the element in the doubly linked list that has the median value;

reinserting the element already in the doubly linked list back into the doubly linked list at the insertion location; and if the LoR bit was changed from indicating that the element already in the doubly linked list was on the left of the element in the doubly linked list that has the median value to indicating that the element already in the doubly linked list is on the right of the element in the doubly linked list that has the median value, changing the value of the public variable to the key of the element that is linked to the right of the element in the doubly linked list that has the median value, or if the LoR bit was changed from indicating that the element already in the doubly linked list was on the right of the element in the doubly linked list that has the median value to indicating that the element already in the doubly linked list is on the left of the element in the doubly linked list that has the median value, changing the value of the public variable to the key of the element that is linked to the left of the element in the doubly linked list that has the median value, or if the LoR bit was not changed, not changing the value of the public variable.

9. The method of claim 7, further comprising, when no element already in the doubly linked list comprises the same key as the key of the element:

inserting the element into the doubly linked list at the insertion location; and if there are an odd number of elements in the doubly linked list and the LoR bit of the element indicates that it is to the right of the element in the doubly linked list that has the median value, and the immediately previously inserted element has an LoR bit indicating that it was inserted to the right of the element in the doubly linked list that has the median value, changing the value of the public variable to the key of the element that is linked to the right of the element in the doubly linked list that has the median value, or if there are an odd number of elements in the doubly linked list and the LoR bit of the element indicates that it is to the left of the element in the doubly linked list that has the median value, and the immediately previously inserted element has an LoR bit indicating that it was inserted to the left of the element in the doubly linked list that has the median value, changing the value of the public variable to the key of the element that is linked to the left of the element in the doubly linked list that has the median value, or if there an even number of elements in the doubly linked, or the LoR bit of the element indicates that it is on the opposite side of the element in the doubly linked list with the median value as the immediately previously inserted element, not changing the value of the public variable.

10. A computer-implemented system comprising:

a storage comprising a copy of a decentralized database; and a processor configured to check the median value of a transactional resource in relation to a specified external resource, compare the median value of the transactional resource to a threshold value for the transactional resource to determine whether the median value of the transactional resource is above the threshold value or below the threshold value, increase the supply of the transactional resource in a distributed network in response to determining that the transactional resource is above the threshold value or decrease the supply of the transactional resource in the distributed network in response to determining that the transactional resource is below the threshold value, wherein the processor is further configured to increase the supply of the transactional resource in the distributed network by generating, by the computing device in the distributed network, an amount of the transactional resource, and conducting, by the computing device in the distributed network, an auction of the generated amount of the transactional resource, wherein the participants in the auction are one or more other computing devices in the distributed network, wherein the auction comprises an auction cap based on the generated amount of the transactional resource, and wherein each one of the one or more other computing devices in the distributed network that are participants in the auction participates by:

submitting, by the one of the one or more other computing devices in the distributed network, a bid comprising a sell amount and a buy amount, wherein the ratio of the sell amount to the buy amount comprises an exchange rate for the bid;

inserting, by the one of the one or more other computing devices in the distributed network, a node for the bid into a balanced binary search tree for the auction while maintaining a sort order of the balanced binary search tree;

updating sub tree totals for each node of the balanced binary search tree whose child nodes are changed by the inserting of the node for the bid, wherein the sub tree total comprises the sum of all buy amounts for all of the nodes in a nodes sub tree which includes the node;

determining, by the one of the one or more other computing devices in the distributed network, a total buy amount for all bids with nodes in the balanced binary search tree at better exchange rates than the exchange rate of the bid submitted by the one of the one or more other computing devices in the distributed network; and determining, by the one of the one or more other computing devices in the distributed network, if the buy amount from the bid submitted by the one of the one or more other computing devices in the distributed network fits under the auction cap and over the total buy amount for all bids with nodes in the balanced binary search tree at better exchange rates.

11. The system of claim 10, wherein the processor is configured to determine if the buy amount from the bid submitted by the one of the one or more other computing devices in the distributed network fits under the auction cap and over the total buy amount for all bids with nodes in the balanced binary search tree at better exchange rates by locating, by the one of the one or more other computing devices in the distributed network, the node for the bid submitted by the one of the one or more other computing devices in the distributed network in the balanced binary search tree, starting the total buy amount for all bids with nodes in the balanced binary search tree at better exchange rates at the sub tree total of the left child node of the node for the bid, and until a null node is stepped up to, stepping up from a current node, which starts as the node for the bid, and, when stepping up from a right child node, adding to the total buy amount for all bids with nodes in the balanced binary search tree at better exchange rates the buy amount from the node stepped up to and the sub tree total from the left child node of the node stepped up to.

12. The system of claim 10, wherein the processor is further configured to receive, in a reserve account in a decentralized database of the distributed network, amounts of fixed resource from user accounts associated with computing devices in the distributed network that submitted bids in the auction that fit under the auction cap and over bids at better exchange rates, and transfer, to the user accounts associated with the computing devices in the distributed network that submitted bids in the auction that fit under the auction cap and over bids at better exchange rate, amounts of the transactional resource.

13. The system of claim 10, wherein the processor is configured to decrease the supply of the transactional resource in the distributed network by conducting an auction of an amount of tokens, wherein the participants in the auction are one or more other computing devices in the distributed network, wherein the auction comprises an auction cap based on the amount of the tokens being auctioned.

14. The system of claim 13, wherein the processor is further configured to receive, in a reserve account in a decentralized database of the distributed network, amounts of the transactional resource from user accounts associated with computing devices in the distributed network that submitted bids in the auction that fit under the auction cap and over bids at better exchange rates, transfer, to the user accounts associated with the computing devices in the distributed network that submitted bids in the auction that fit under the auction cap and over bids at better exchange rate, amounts of the tokens, and destroy the received amounts of the transactional resource.

15. The system of claim 10, wherein the processor is configured to check the median value of a transactional resource in relation to a specified external resource by retrieving a value of a public variable, wherein the value comprises a key of an element in a doubly linked list, locate the element of the doubly linked list using the key, and read the median value of the transactional resource from the element of the doubly linked list.

16. The system of claim 15, wherein the processor is configured to maintain the doubly linked list by receiving, from a computing device of the distributed network that has been whitelisted, an element comprising a key of the element, a reported value of the transactional resource from an exchange, and an insertion location comprising a key of an element of the doubly linked list to be linked to the right of the element and a key of an element of the doubly linked list to be linked to the left of the element, and an LoR bit indicating whether the insertion location is to the left or right of an element in the doubly linked list that has the median value and determining if an element already in the doubly linked list comprises the same key as the key of the element.

17. The system of claim 16, wherein the processor is configured to, when an element already in the doubly linked list comprises the same key as the key of the element, update the element already in the doubly linked list with the reported value, change the LoR bit of the element already in the doubly linked list if the insertion location is on the opposite side of the element in the doubly linked list that has the median value, reinsert the element already in the doubly linked list back into the doubly linked list at the insertion location, and if the LoR bit was changed from indicating that the element already in the doubly linked list was on the left of the element in the doubly linked list that has the median value to indicating that the element already in the doubly linked list is on the right of the element in the doubly linked list that has the median value, change the value of the public variable to the key of the element that is linked to the right of the element in the doubly linked list that has the median value, or if the LoR bit was changed from indicating that the element already in the doubly linked list was on the right of the element in the doubly linked list that has the median value to indicating that the element already in the doubly linked list is on the left of the element in the doubly linked list that has the median value, change the value of the public variable to the key of the element that is linked to the left of the element in the doubly linked list that has the median value, or if the LoR bit was not changed, not change the value of the public variable.

18. The system of claim 16, wherein the processor is configured to, when no element already in the doubly linked list comprises the same key as the key of the element, insert the element into the doubly linked list at the insertion location, and if there are an odd number of elements in the doubly linked list and the LoR bit of the element indicates that it is to the right of the element in the doubly linked list that has the median value, and the immediately previously inserted element has an LoR bit indicating that it was inserted to the right of the element in the doubly linked list that has the median value, change the value of the public variable to the key of the element that is linked to the right of the element in the doubly linked list that has the median value, or if there are an odd number of elements in the doubly linked list and the LoR bit of the element indicates that it is to the left of the element in the doubly linked list that has the median value, and the immediately previously inserted element has an LoR bit indicating that it was inserted to the left of the element in the doubly linked list that has the median value, change the value of the public variable to the key of the element that is linked to the left of the element in the doubly linked list that has the median value, or if there an even number of elements in the doubly linked, or the LoR bit of the element indicates that it is on the opposite side of the element in the doubly linked list with the median value as the immediately previously inserted element, not change the value of the public variable.

* * * * *